Sept. 9, 1952  R. H. HELSEL  2,609,746
TICKET PRINTING AND ISSUING MACHINE
Filed July 3, 1947  19 Sheets-Sheet 1

INVENTOR.
Reuben H. Helsel
BY
Busser & Harding
ATTORNEYS

INVENTOR.
Reuben H. Helsel
BY
ATTORNEYS

INVENTOR.
Reuben H. Helsel
BY
ATTORNEYS

Sept. 9, 1952 R. H. HELSEL 2,609,746
TICKET PRINTING AND ISSUING MACHINE
Filed July 3, 1947 19 Sheets-Sheet 6

INVENTOR.
Reuben H. Helsel
BY
ATTORNEYS

INVENTOR.
Reuben H. Helsel
BY
ATTORNEYS

Sept. 9, 1952 R. H. HELSEL 2,609,746
TICKET PRINTING AND ISSUING MACHINE
Filed July 3, 1947 19 Sheets-Sheet 8

INVENTOR.
Reuben H. Helsel
BY
ATTORNEYS

Sept. 9, 1952 R. H. HELSEL 2,609,746
TICKET PRINTING AND ISSUING MACHINE
Filed July 3, 1947 19 Sheets-Sheet 9
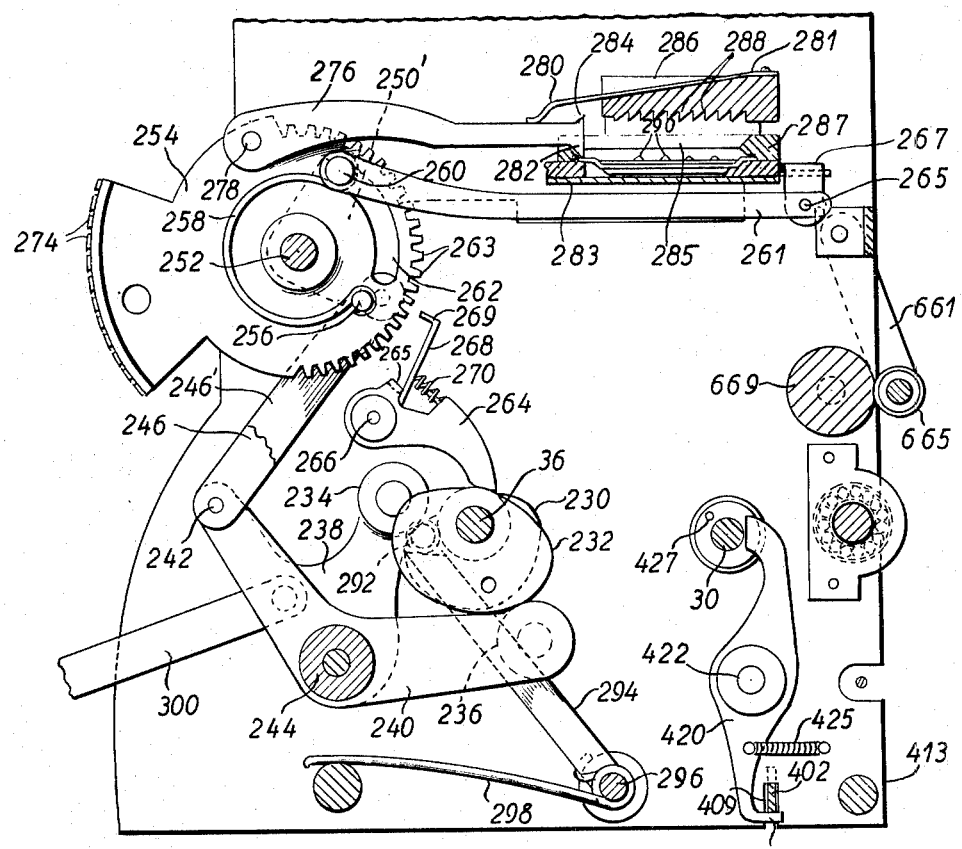
Fig. 12.
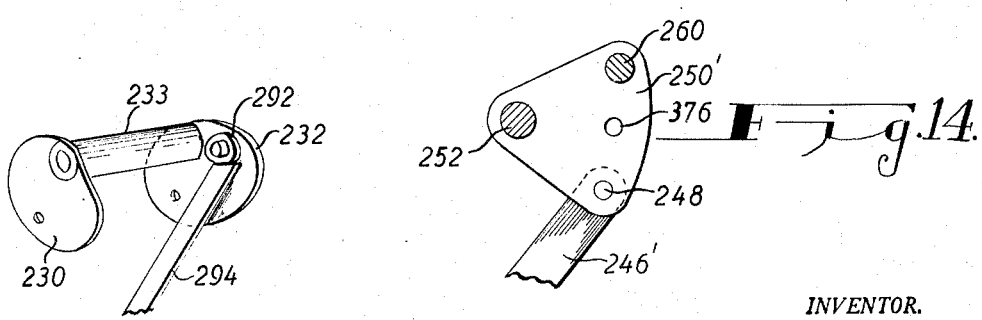
Fig. 13.
Fig. 14.
INVENTOR.
Reuben H. Helsel
BY
ATTORNEYS Sept. 9, 1952          R. H. HELSEL          2,609,746

TICKET PRINTING AND ISSUING MACHINE

Filed July 3, 1947          19 Sheets—Sheet 10

INVENTOR.
Reuben H. Helsel
BY
ATTORNEYS

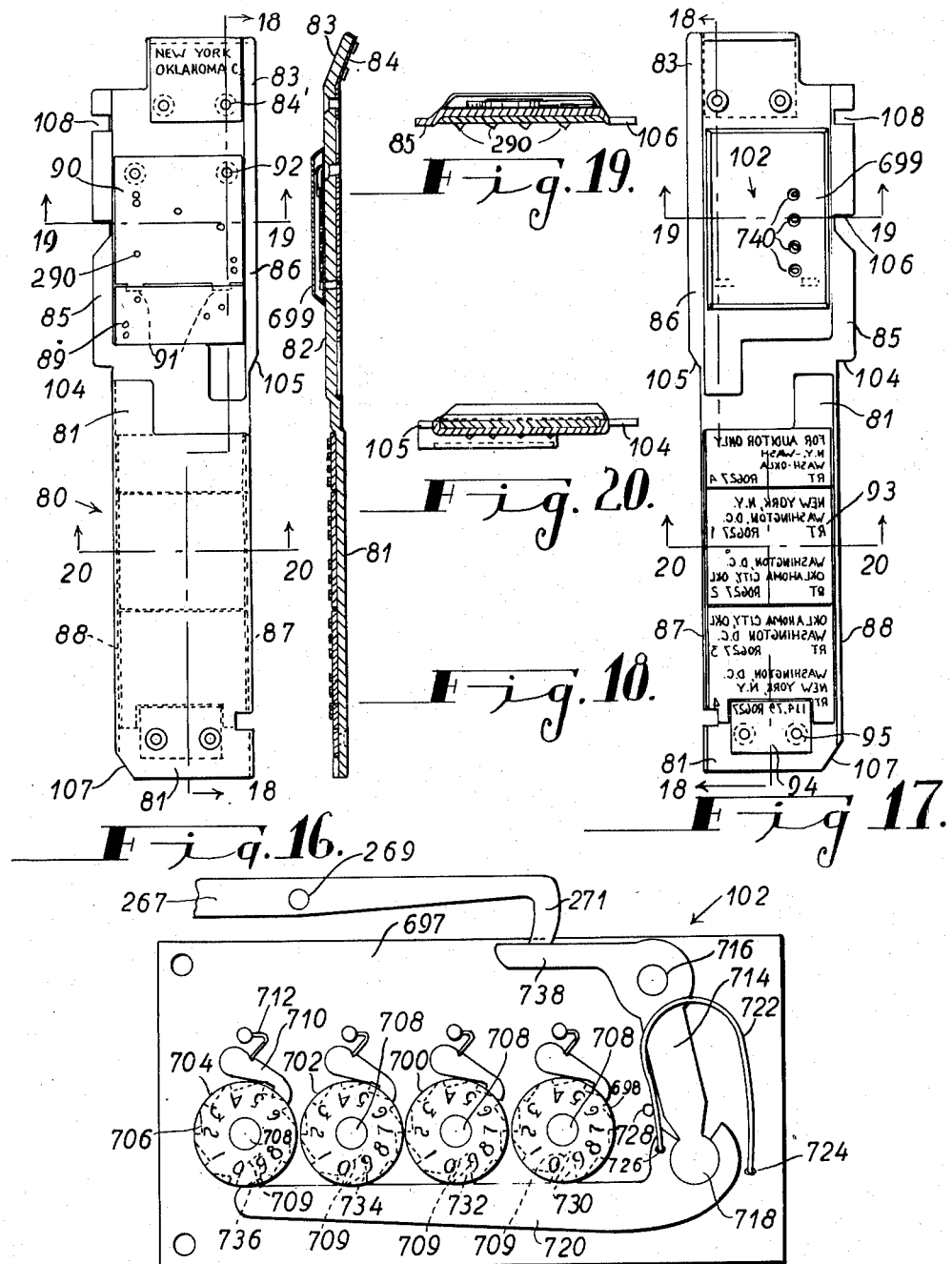

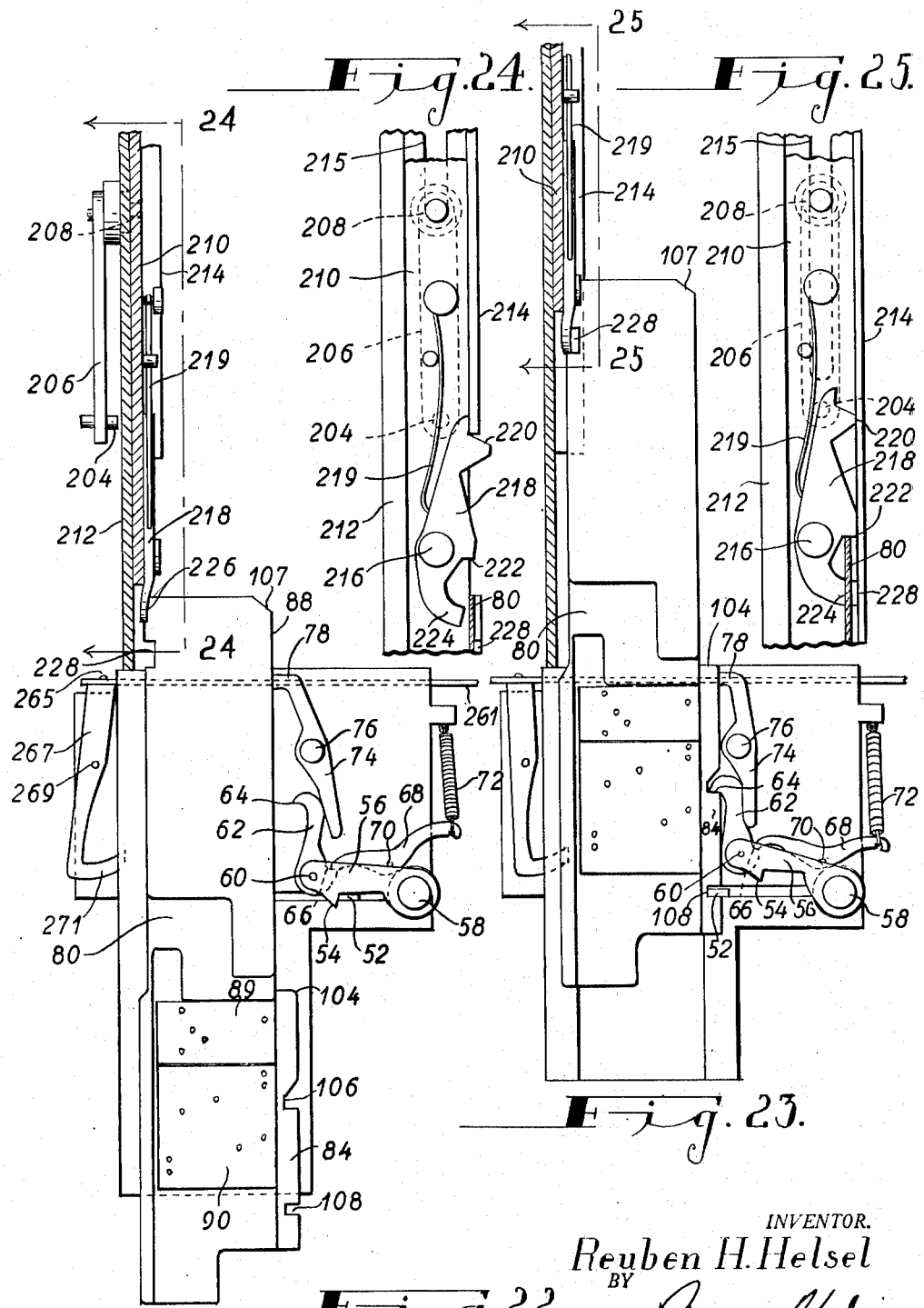

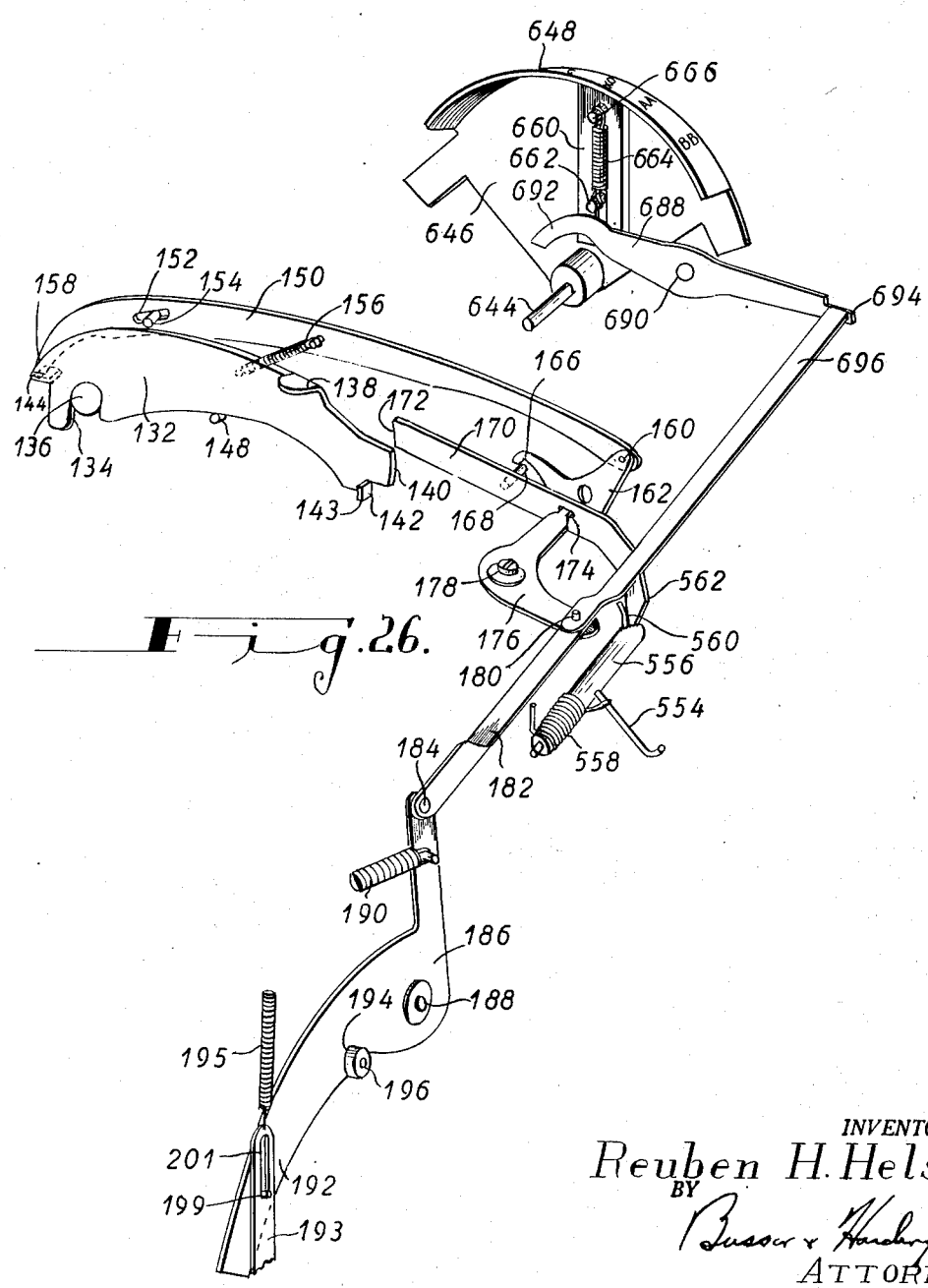

Sept. 9, 1952 R. H. HELSEL 2,609,746
TICKET PRINTING AND ISSUING MACHINE
Filed July 3, 1947 19 Sheets-Sheet 14
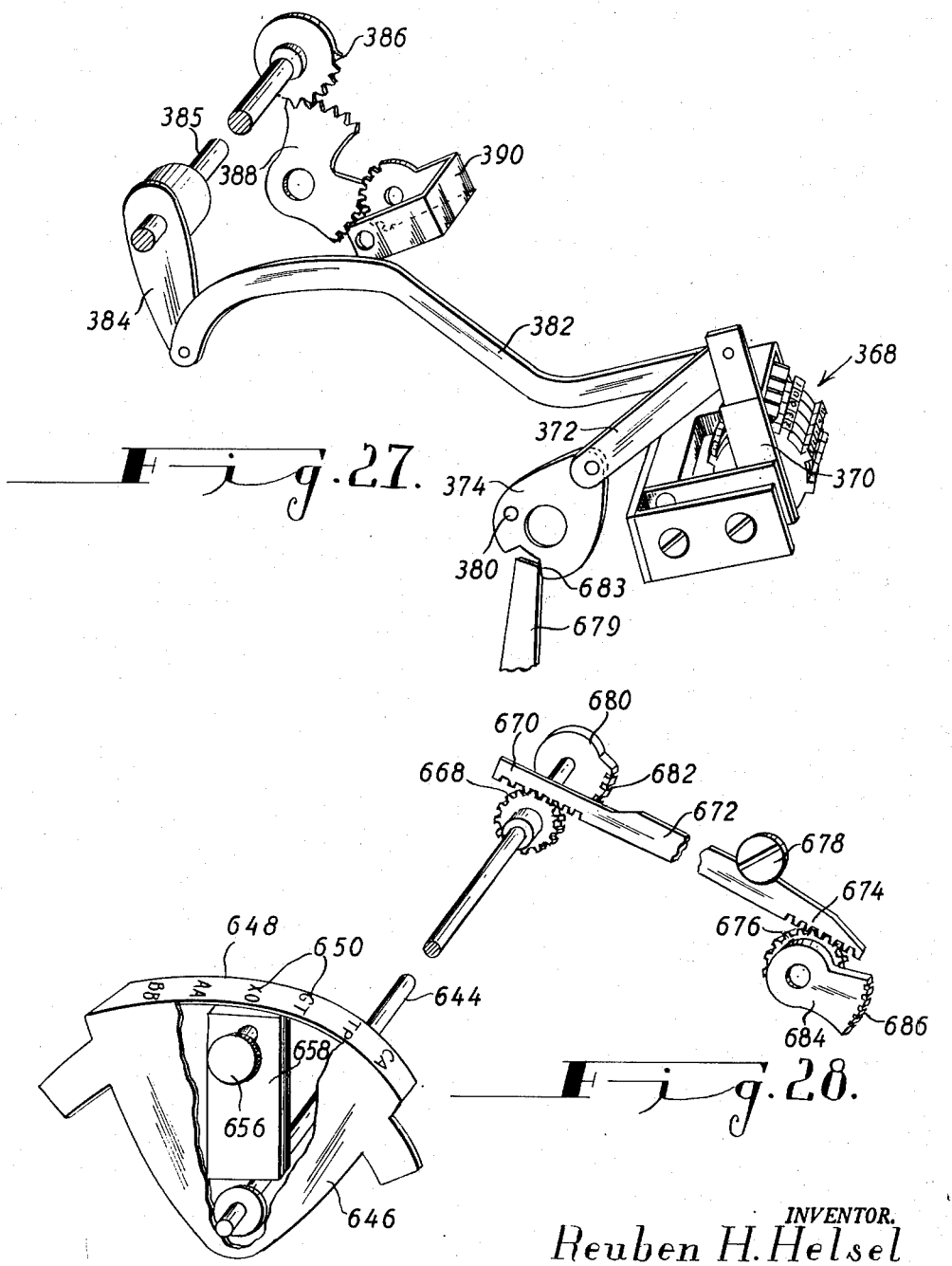
INVENTOR.
Reuben H. Helsel
BY
ATTORNEYS Sept. 9, 1952 R. H. HELSEL 2,609,746
TICKET PRINTING AND ISSUING MACHINE
Filed July 3, 1947 19 Sheets-Sheet 15

INVENTOR.
Reuben H. Helsel
BY
ATTORNEYS

Sept. 9, 1952 — R. H. HELSEL — 2,609,746
TICKET PRINTING AND ISSUING MACHINE
Filed July 3, 1947 — 19 Sheets-Sheet 16

INVENTOR.
Reuben H. Helsel
BY
Busser & Harding
ATTORNEYS

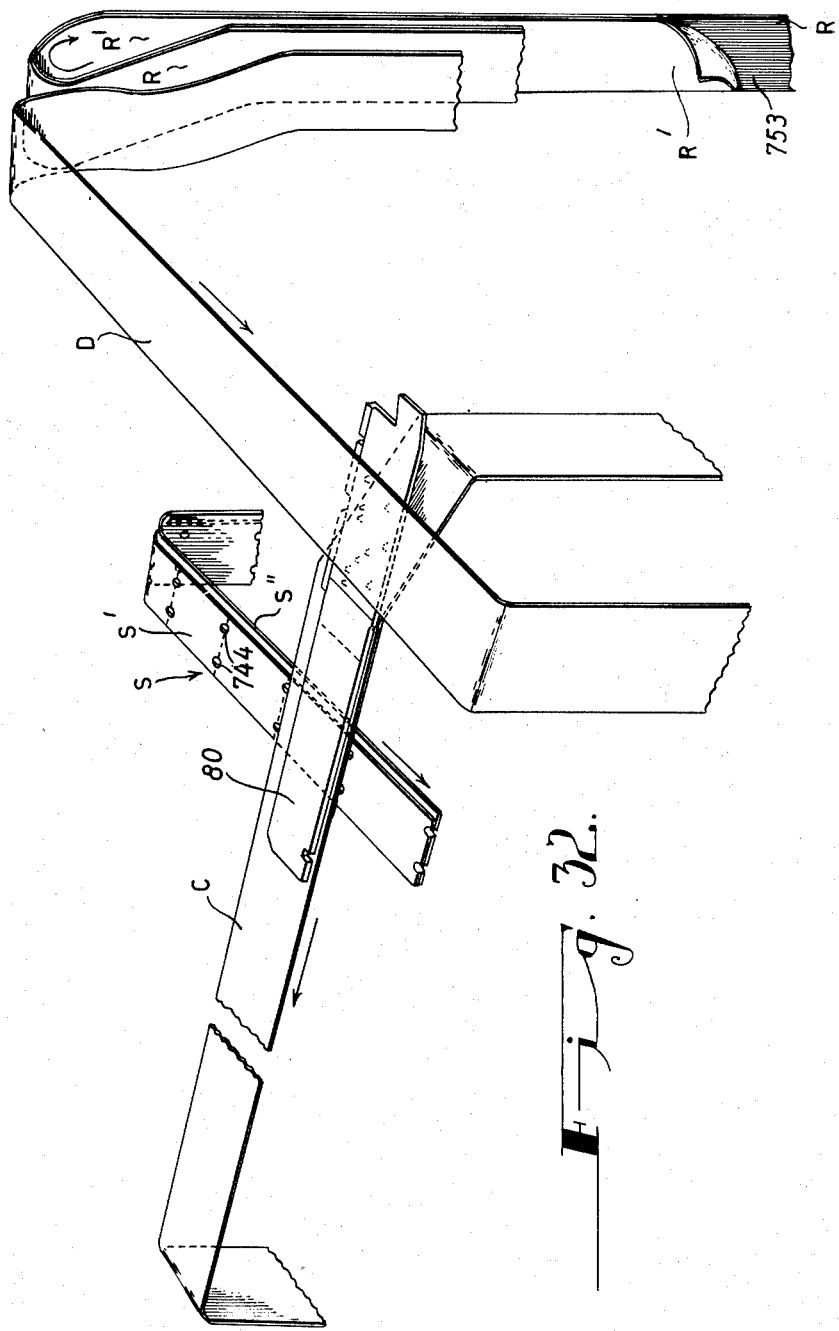

Sept. 9, 1952          R. H. HELSEL          2,609,746
TICKET PRINTING AND ISSUING MACHINE
Filed July 3, 1947          19 Sheets-Sheet 18
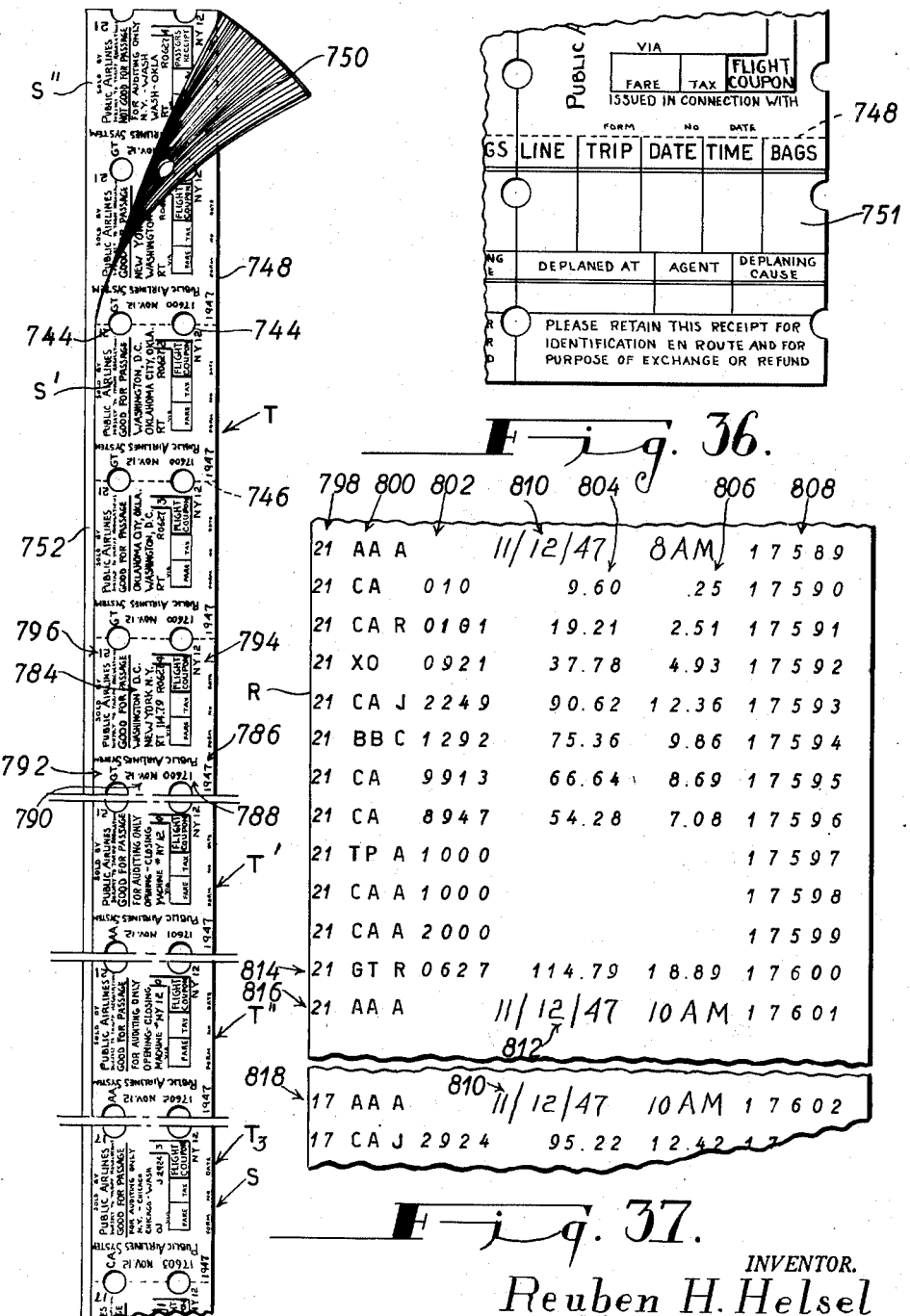

Sept. 9, 1952 R. H. HELSEL 2,609,746
TICKET PRINTING AND ISSUING MACHINE
Filed July 3, 1947 19 Sheets-Sheet 19
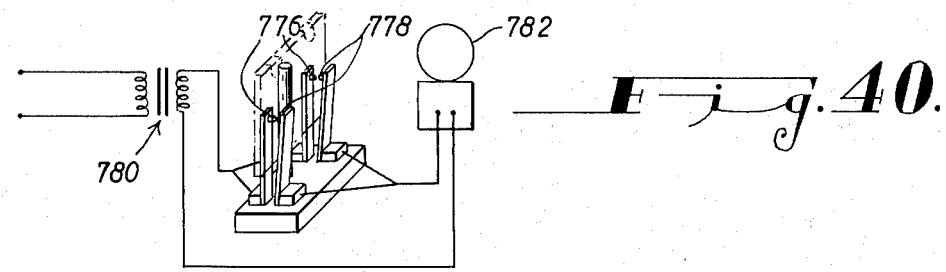
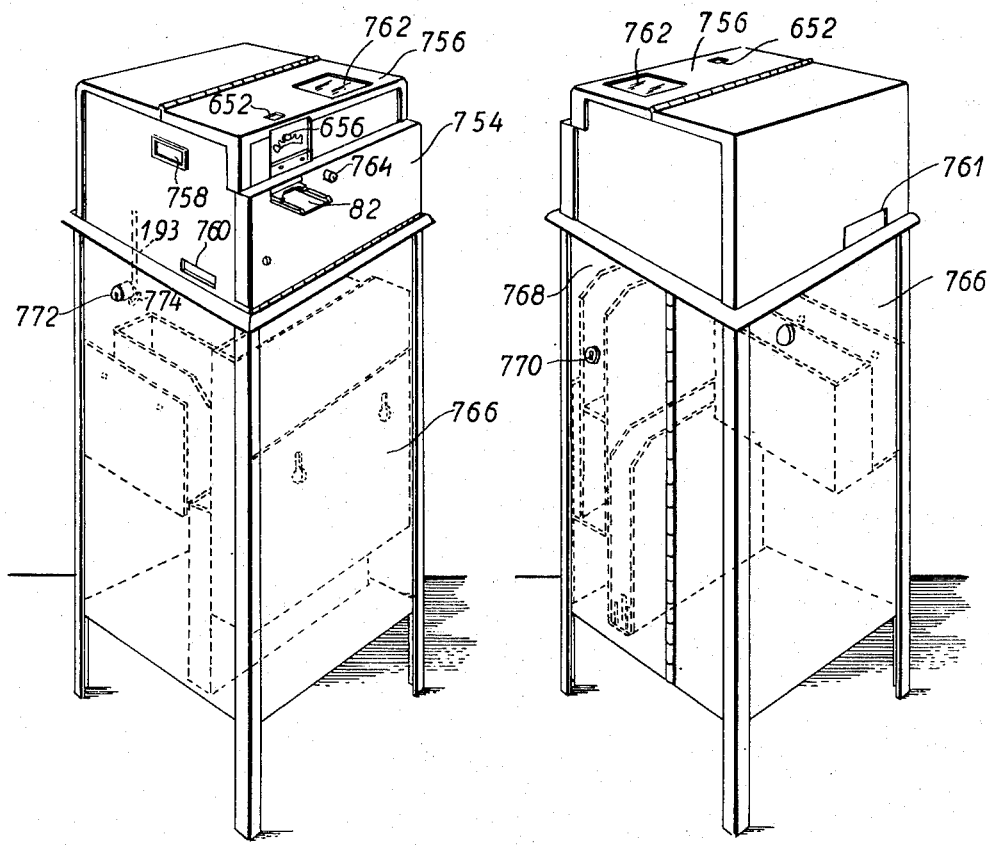
INVENTOR.
Reuben H. Helsel
BY
Busser & Harding
ATTORNEYS Patented Sept. 9, 1952

2,609,746

UNITED STATES PATENT OFFICE 2,609,746

TICKET PRINTING AND ISSUING MACHINE

Reuben H. Helsel, Long Island City, N. Y., assignor to General Register Corporation, Long Island City, N. Y., a corporation of New York Application July 3, 1947, Serial No. 758,811

26 Claims. (Cl. 101—68)

This invention relates to a ticket issuing machine particularly adapted for issuing transportation tickets for railroads, buses, airlines, etc. The invention, however, is also applicable to other machines which are required to print a large variety of different tickets.

The broad object of the invention is the provision of a machine for the issuance of tickets of the general type indicated. In the matter of issuing tickets for common carriers, it is particularly useful inasmuch as it avoids the necessity for stocking large numbers of tickets and it facilitates accounting of sales. At present, a station is required to stock printed tickets for all of the various destinations for which tickets may be sold from that station or alternatively must stock tickets of a semiblank type which must be filled in by stamping or writing to take care of routes or destinations which are not commonly used. The common practice with respect to railroad tickets will indicate the major advantages of the present invention. Each ticket agent in a station generally has his own individual case of tickets which is kept locked when he is off duty. He is responsible for the tickets in his case. Beyond the matter already printed on the tickets, the only step in the direction of validation thereof is the printing or writing of certain data on the ticket, commonly involving on a completely printed ticket merely the stamping of the date and the seller's code thereon. Stamped or written matter can be very easily duplicated by anyone desiring to perpetrate a fraud, and, consequently, it may be considered that the tickets represent a substantial value in money which necessitates precautions against fraud or larceny. Accounting of the sale of tickets is also quite complicated inasmuch as the tickets must be counted in order to ascertain the stock of preprinted tickets on hand, and, in the case of tickets which are filled in by writing or stamping, there must be kept stubs requiring examination for accounting purposes. In the case of any active station, it will be evident that keeping track of the tickets and insuring against theft or fraud involves much expenditure of care and labor.

In my prior application, Serial No. 634,697, filed December 13, 1945, there is disclosed and claimed a ticket issuing machine particularly designed for the printing and issuing of tickets for transportation on a common carrier, such as a railroad, bus or airline. The machine of that application is of a type particularly designed to issue tickets of single coupon type such as are commonly used as coach tickets on railroads for transportation on a single line between stations. The machine of that application is particularly designed for the issuance of such simple tickets between points of major traffic. For example, when used in a large city, the machine may be provided with a type carrier, which, by manual manipulation, may print tickets between the station of origin and substantially all of the stations within a large radius from the city which have any major amount of traffic thereto. The machine of that application is also arranged to issue tickets upon the insertion of a slug which carries type to print tickets to less popular destinations. The machine also involves accounting devices which keep track of the tickets issued either on counters or on a record tape.

The present machine embodies various principles of the machine of said application but from the practical standpoint is primarily adapted for a different type of use. Whereas the machine of my prior application is designed primarily to issue what might be called local tickets, or at any rate, tickets between destinations on the line of origin, constituting the major number of tickets issued by railroads and bus lines, and some tickets issued by airlines, the machine of the present invention is designed to issue tickets of more complex type and in particular tickets involving multiple coupons such as are required for round trips or for long railroad or airline journeys where different carries are involved in travel over various portions of the complete route. It will be evident that the machine of the prior application and the machine of the present application overlap in their utility but different stations may have such traffic problems as would make one or the other more useful. It will, of course, be evident that a major station or terminal may well have use for both types of machines for different purposes.

While the present invention relates to a machine which is capable of doing all that the machine of my prior application will do in issuing single coupon tickets, it will perform quite elaborate operations as well to issue complex tickets, and, in order to indicate its advantages, there will be primarily stressed the issuance of tickets of multiple coupon type.

The present machine utilizes ticket stock which may be of folded or duplicate form for the purpose of providing both a ticket which may be lifted on the vehicle and a receipt for retention by the patron. Under the control of slugs which carry multiple type faces, the machine will issue in a single complete cycle of operation a multiple coupon ticket, including both ticket and receipt portions, with or without special auditing coupons. Coupon tickets are issued in strip form with the parts delimited by perforated lines for the removal of the individual coupons. The ticket stock is preprinted to the extent of universal matter which should appear on all tickets, for example, the name of the issuing carrier, conditions of sales, designation of certain boxes or areas in which destinations, routes, fares, taxes, etc., are to be printed, data concerned with changes of routing, etc. The machine superimposes on this printed matter certain information required for particular tickets except for such matter as is subject to such large variation in practice that it must be written in. The sole limitation on the printing which may be accomplished on the tickets is one of practicability. A separate slug is provided for each type of ticket which, to a reasonable extent, is required in such numbers as will warrant the stocking of such slugs. In the majority of instances, the slugs may print complete tickets which require no entries of written matter such as tickets between major points. On the other hand, the slugs may print some matter and leave blanks in which minor stations may be written. In any event, the machine completely eliminates the necessity for maintaining stocks of tickets, which, if stolen, would represent substantial loss by reason of their being readily transformed into the appearance of valid tickets. The machine, furthermore, minimizes the necessity for care and work on the part of the ticket seller in entering stations on the tickets and in looking up the transportation charges, dating the tickets, or the like. Even in the case of tickets which require a major amount of written-in data, the tickets will not be validated except by issuance from the machine.

One feature of the present invention is the issuance of tickets with the prices printed thereon with the concurrent printing of a record of the sale and the price together with tax.

The machine also involves devices for preventing improper issue of tickets without a proper accounting record. Individual keys of the various tickets sellers must be properly inserted into the machine before the machine may operate. These keys carry printing type, recording both on the issued tickets and in the machine a record identifying the seller. In the use of the machine it is the duty of each seller to secure a special coupon at the beginning of his tour of duty, these coupons to be turned in to serve as a record of the use of the machine by each seller. The tickets and the coupons are serially numbered and these serial numbers also appear on a permanent record made in the machine and on a duplicate record which may be removed by the ticket seller. These various features of keeping proper records and of preventing fraudulent operation will become clearer as the description of the machine and its operation proceeds.

The serial numbering of the tickets just mentioned is so carried out that when a multiple coupon ticket is issued the same serial number appears on all of the coupons of the same ticket, successive serial numbers only appearing on tickets issued in different complete cycles of operation.

A convenient coding means is provided for the purpose of designating tickets or coupons issued under varying conditions such as tickets involving special rates or the like.

The foregoing general discussion will indicate the broader objects of the present invention. Various other objects thereof relate to the handling of the ticket and record strip, the construction of slugs, and various details of the mechanism whereby the proper desired results are attained.

In accordance with the invention, each of the slugs is provided with an individual counter which is operated in the machine operation for the purpose of keeping a record of the number of tickets issued by each slug.

All of these objects will become apparent from the following description read in conjunction with the accompanying drawings, in which:

Figure 12 is a vertical section taken on the plane indicated at 12—12 in Figure 1;

Figure 13 is a perspective view of certain cams and associated parts illustrated in Figure 12;

Figure 14 is a section taken on the plane indicated at 14—14 in Figure 1;

Figure 16 is a plan view of the top of a typical slug;

Figure 17 is a bottom plan view of the same slug;

Figure 18 is a section through the slug taken on the plane indicated at 18—18 in Figures 16 and 17;

Figure 19 is a section taken on the plane indicated at 19—19 in Figures 16 and 17;

Figure 20 is a section taken on the plane indicated at 20—20 in Figures 16 and 17;

Figure 21 is a plan view of the interior of a counter individually associated with a slug;

Figure 22 is a sectional and plan view of a slug and various parts associated therewith indicating the initial entry of the slug into the machine;

Figure 23 is a similar view but showing the slug fully inserted to the position in which it trips the machine into operation;

Figure 24 is a fragmentary section taken on the plane indicated at 24—24 in Figure 22;

Figure 25 is a fragmentary section taken on the plane indicated at 25—25 in Figure 23;

Figure 26 is a perspective view showing, in particular, the operator's key and various associated locking devices;

Figure 27 is a perspective view showing, in particular, the operating devices for a pair of numbering heads adapted to print the serial numbers on the tickets and the record strips;

Figure 28 is a perspective view showing the code selector and code printing means;

Figure 32 is a perspective view showing the paths of movement of various paper strips in the machine and their relationship to a slug during the printing operation;

Figure 35 is a plan view showing the ticket strip and indicating the nature of a printed ticket and closing and opening coupons with the severance lines between them;

Figure 36 is a plan view of the back of a receipt portion of a coupon and illustrating typical printed data which may be provided thereon;

Figure 37 is a plan view of the machine record tape showing the entries of a typical tour of duty of a seller including opening and closing entries and showing also several entries resulting from operation by a subsequent seller;

Figure 38 is a perspective view showing the front, right side and top of the machine casing;

Figure 39 is a perspective view showing the back, left and top of the machine casing; and Figure 40 is an elevation, partially diagrammatic, showing the signaling means for indicating approaching exhaustion of the ticket strip.

Figures 1, 2:
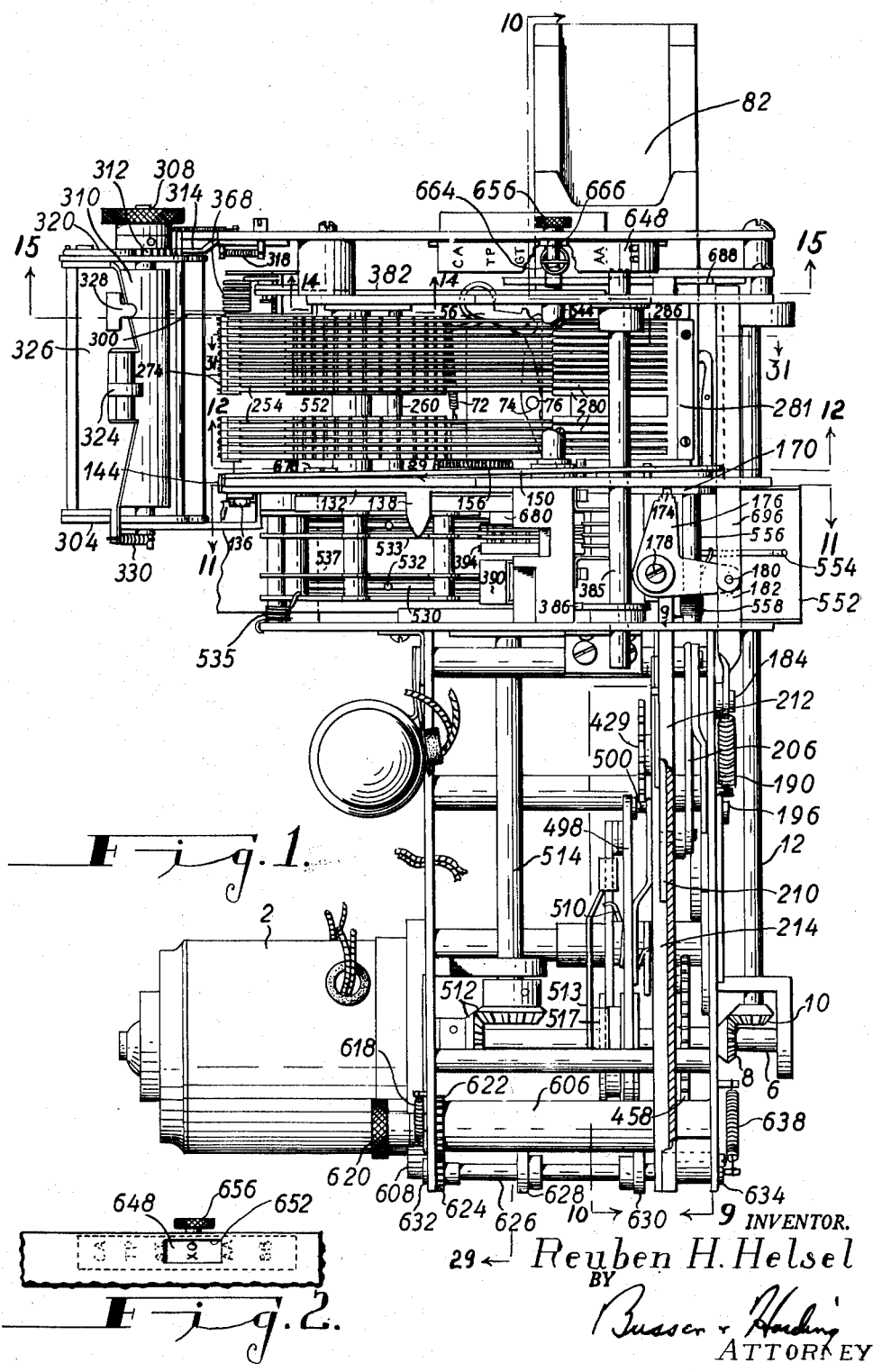
Figure 1 is a plan view of the operating mechanism of a preferred embodiment of the machine.
Figure 2 is a fragmentary plan view showing, in particular, the code selector.

The operating mechanism of the machine is mounted in a frame largely made up of connected plates which will be evident from the drawings and need not be described in detail. Power for operation is derived from a motor 2 which drives through reduction gearing indicated at 4 a shaft 6, the outer end of which is provided with a bevel pinion 8 meshing with a second bevel pinion 10 to drive the shaft 12. A pinion 14 on the shaft 12 is arranged to drive a gear clutch of the type illustrated in my Patent 2,309,191, dated January 26, 1943. As illustrated best in Figures 5 and 15, the clutch comprises a gear 16 having a portion of its periphery cut away at 18 and carrying a gear segment 20 pivoted to it at 22 and adapted to move through a limited range defined by engagement of a pin 28 carried by the gear 16 with the sides of an opening 26 provided in the segment. A spring 29 urges the segment in a counterclockwise direction as viewed in Figure 15. A pin 24 carried by the segment is engageable, as will shortly appear, to disengage the segment from the pinion 14. When released the segment meshes with the pinion 14 and then forms a continuous toothed periphery for the gear 16. A second gear 32 is carried by the shaft 30 of the gear 16 and meshes with a gear 34 secured to a shaft 36.

A multiple-armed lever 38 is pivoted on a stud 39 secured in the frame. One arm 40 of this lever 38 is provided with a hook portion adapted to be engaged by the pin 24 and to restrain this pin and the segment 20 to disengage the clutch. A second arm 42 of the lever is connected through a link 44 to a lever 46 pivoted on a stud 48 secured in the frame and urged clockwise as viewed in Figure 15 by a spring 50.

A projection 52 on the upper end of the lever 46 is normally restrained by a shoulder 54 on a lever 56 pivoted at 58 in the frame as indicated in Figures 22 and 23. To the free end of the lever 56 there is pivoted at 60 a second lever 62 having a hook 64 and a step 66, the latter engageable by one end of a lever 68 pivoted to the frame at 70 and urged in a counterclockwise direction as viewed in Figure 22 by a spring 72. Another lever 74 pivoted at 76 to the frame is provided with a nose 78 and is arranged to engage the lever 62 for a purpose which will be hereafter apparent.

The machine is adapted to be operated and to effect selective operations through the insertion and actuation of slugs 80 typified in Figures 16 to 19, inclusive, the constructions and variations of which will be more fully described hereafter.

In common with each other these slugs have certain structural characteristics taking part in the initiation of operation of the machine. These will now be described.

Each of the slugs 80 comprises a strip of sheet metal which is pressed upwardly at 81 to form a depression in its lower side and downwardly at 82 to form a depression in its upper side for the respective reception of type plates and control plates. These pressed regions overlap each other and serve to strengthen the slug, permitting it to be made relatively light in weight. One end of the slug is turned upwardly as indicated at 83 and carries a tab 84 riveted to the slug at 84', this tab carrying printing identifying the slug. The slug is provided with a pair of laterally extending flanges 85 and 86 and with a pair of down-turned flanges 87 and 88, the latter resulting from the formation of the pressed-up portion 81. The top of the slug carries a permanent plate 89 and a removable plate 90, the former being spot welded to the slug and the latter being held by engagement of ears 91 extending beneath the edge of the former and by rivets 92. These plates carry projections 290 to which reference will be made hereafter. The underside of the slug carries type plates including one or more permanent type plates 93 and a removable type plate 94 riveted to the slug at 95 by means of flanges extruded at the edges of holes in the type plate.

Each slug carries a counter which is indicated generally at 102 and will be referred to in greater detail hereafter. The flange 85 is provided with an abutment 104 and notches 106 and 108 as illustrated. The flange 86 is bevelled at its forward end as indicated at 105 and the slug is bevelled at its forward end as indicated at 107.

The machine frame is provided with a guideway 82 into which the slug is adapted to be inserted to initiate operation of the machine. Figure 22 illustrates the partial insertion of the slug into the machine from the position in which figure the slug is advanced to the position illustrated in Figure 23 to initiate operation. To the extent of cooperation of the parts heretofore described the events which occur in movement of the slug from the position of Figure 22 to that of Figure 23 may be described as follows:

When the shoulder 104 of the flange 84 engages the nose 78 of the lever 74 this lever is rocked clockwise and causes a counterclockwise movement of the lever 62, against the action of the spring 72, to cause engagement of the nose 64 in the notch 106. The further insertion of the slug then carries the lever 62 with it, rocking the lever 56 and causing shoulder 54 to disengage the projection 52 on the lever 46. The lever 46 is thus permitted to have a clockwise motion (Figure 15) under the action of spring 50 resulting in clockwise motion of the lever 38 to release the pin 24 and cause engagement of the clutch. The nose 43 of lever 46 then enters a slot in the adjacent side of the guideway 82 to prevent possible lateral movement of lever 46.

Figure 6:
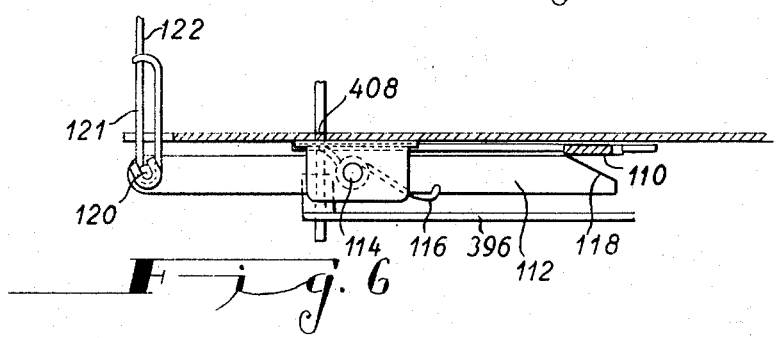
Figure 6 is a fragmentary horizontal section taken on the plane, the trace of which is indicated at 6—6 in Figure 5.

The depending arm 110 of the lever 38 normally holds a lever 112, pivoted to the frame at 114, in a clockwise direction as viewed in Figure 6 against the action of a spring 116 which urges this lever counterclockwise. A bevel 118 on the end of the lever 112 permits the lever 112 to rock counterclockwise under the spring action when the lever 38 is rocked to engage the clutch. A link 122 is provided with a loop 121 embracing a pin 120 on the opposite end of the lever 112 and is connected to a member 124 (Figures 3 and 9) pivoted to the frame at 126 and carrying a pair of spring contacts 128 which, by engagement with fixed contacts 130, close the circuit of the motor 2.

An operator's key 132 not only controls the operability of the machine but serves to make a pair of records indicative of the particular operator. This key, as illustrated particularly in Figures 26 and 30, comprises a flat piece of metal slotted as indicated at 134 to embrace a fixed pin 136 secured in the machine frame and is provided with an ear 138 which may be grasped by the operator. The end of the key opposite that having the slot 134 is provided with a curved edge 140 and with a laterally extending portion 142 carrying a type face 143 which is adapted to imprint on an issued ticket an identification of the operator. The opposite end of the key carries a lateral extension 144 provided with a type face 146 to record the identification of the operator on a record tape within the machine.

Figure 30:
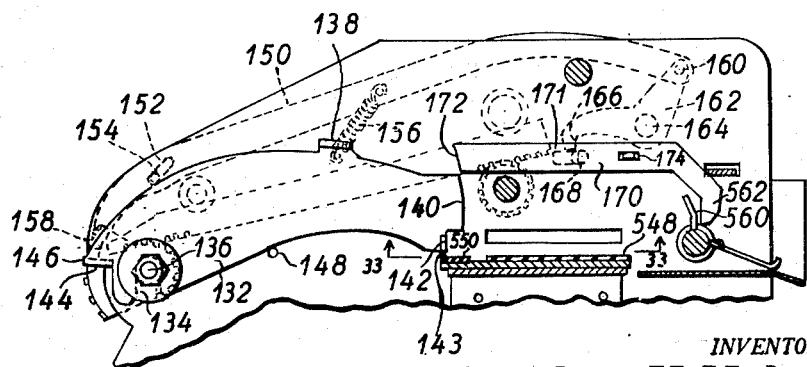
Figure 30 is a fragmentary vertical section taken on the plane indicated at 30—30 in Figure 29.
Figure 31:
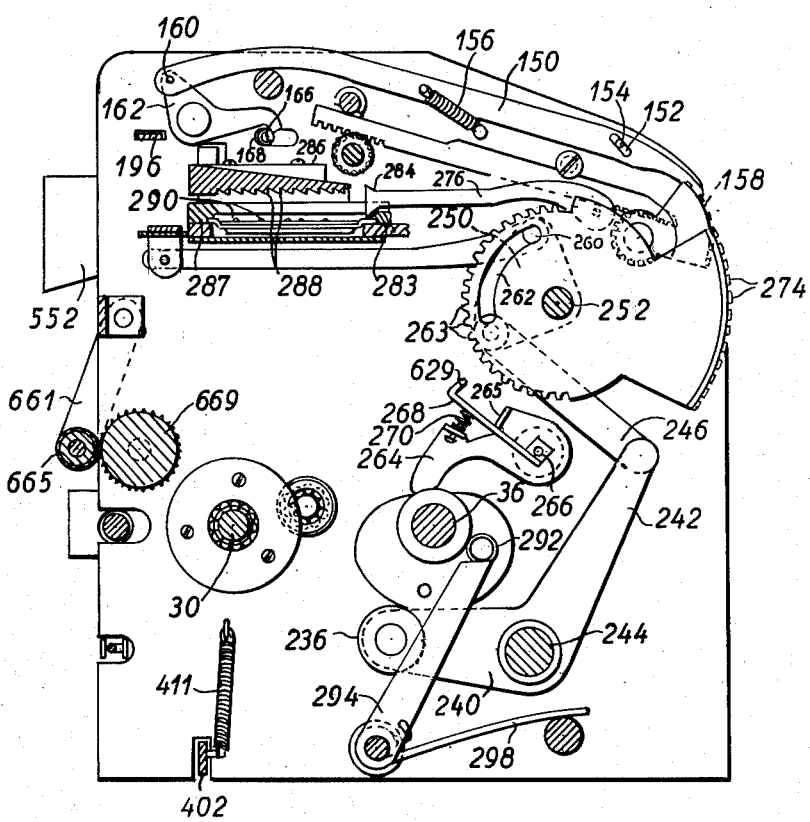
Figure 31 is a vertical section taken on the plane indicated at 31—31 in Figure 1.

A link 150 is provided with a slot 152 embracing a pin 154 fixed in the frame. A spring 156 urges the link 150 toward the left and downwardly as viewed in Figure 30. A double-armed lever 162 pivoted to the frame at 164 has a pivotal connection at 160 with the link 150. The mounting of the link is such that when the key is in operative position as illustrated in the drawings, in contact with a fixed pin 148, the type-carrying lug 144 engages the tail 158 of the link 150 serving to move this link to the right as indicated in Figure 30 to raise the hook end 166 of the lever 162. When so raised the hook 166 clears the pin 168 carried by a slide 170 which is supported by the passage of the pin 168 through a slot 171 in the frame and by the engagement of one arm of a lever 176 in an opening 174 in the slide. The slide 170 is located with the end 172 thereof adjacent to the end 140 of the key but so that, when the key is in normal operative position, the slide 170 is free to move to the left as viewed in Figure 30 over the end of the key to provide a backing for the key in the operation of printing by the type face 143.

Figure 3:
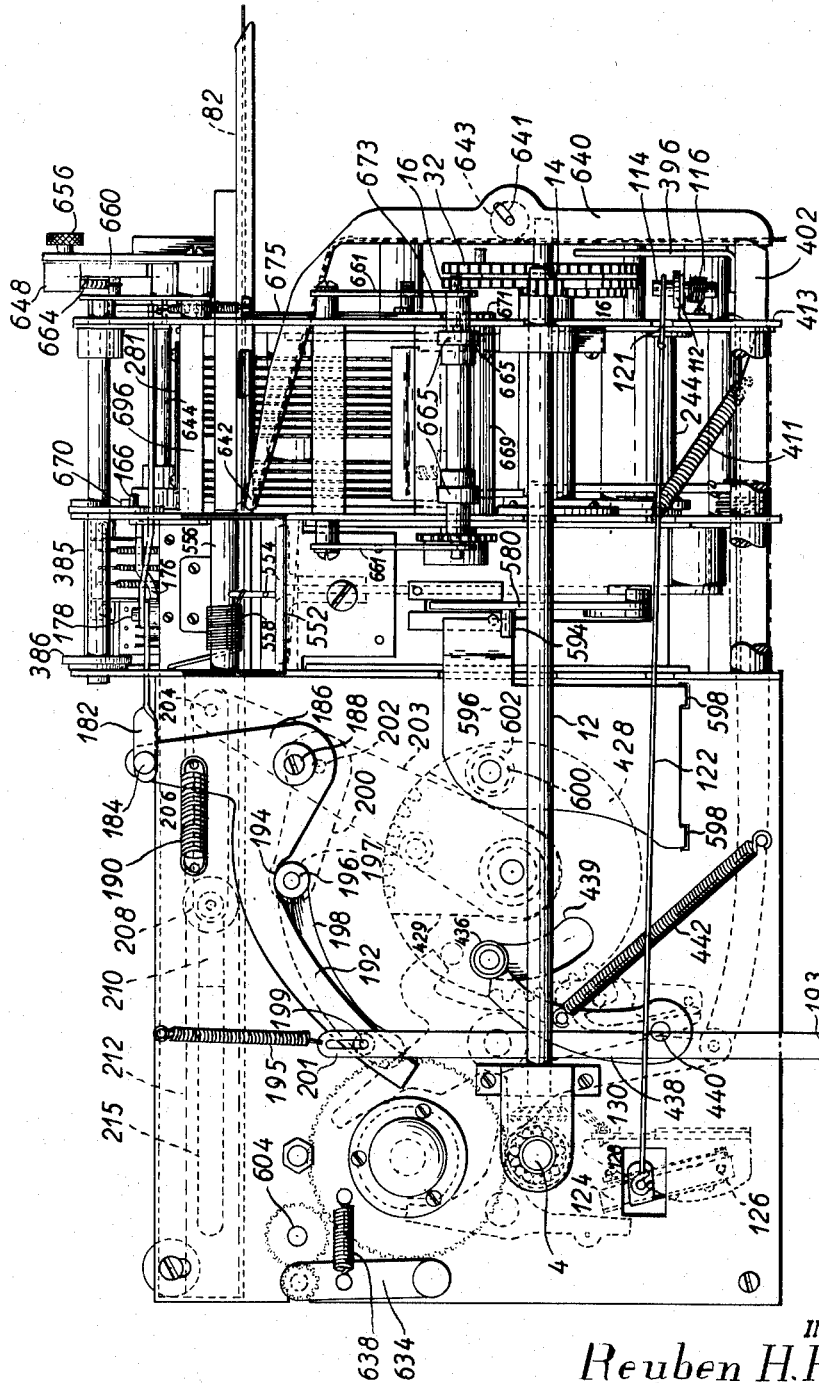
Figure 3 is a front elevation of the machine, "front" being used in the sense of the portion of the machine facing the ticket seller.

The lever 176 is pivoted at 178 to the frame and has at 180 a pivotal connection with a link 182 which, in turn, is pivoted at 184 to the upright arm of a lever 186 pivoted at 188 to the frame and normally urged counterclockwise as viewed in Figures 3 and 26 by a spring 190. The lever 186 is provided with a tail portion 192 and a notch 194 in which may seat a roller 196 carried by a bell crank 200 pivoted at 202 to an arm 203. A guide slot 198 in an adjacent frame plate serves to define a path of movement of a roller 197 concentric with, and the same size as, the roller 196. As will be seen in Figure 3, when the parts of the machine are in initial position the tail 192 of the lever 186 overlaps the slot 198 so that movement of the roller 197 to the left in this slot, as viewed in Figure 3, would result in camming of the lever 186 clockwise. It will be evident that this clockwise movement will be permitted only if the key 132 is in the position illustrated in Figures 26 and 30 so that the link 150 is positioned to release the slide 170 and the slide is permitted to move toward the left over the end 140 of the key. If the key is absent or if it is not fully depressed into substantial contact with the fixed pin 148 the slide 170 is locked and hence the roller is incapable of movement.

The upwardly extending arm of the bellcrank 200 is pivoted at 204 to a link 206 which, in turn, is pivoted at 208 to a slide 210 guided in a guideway provided by members 212 and 214, the latter consisting of a horizontal flange as indicated in Figures 22 to 25, inclusive. The member 212 is slotted for the passage of the pivotal connection 208 as indicated at 215. Pivoted to the slide 210 at 216 is a lever 218 which is urged in a clockwise direction as viewed in Figure 24 by a spring 219. This lever 218 is provided with a nose 220 which, before insertion of a slug, lies behind the end of the flange member 214 to lock the slide 210 against movement. The lever 218 also has a shoulder 222 and a tail portion 224. When a slug is inserted its end 226 first comes in contact with the shoulder 222 after passing beneath the tail 224. Further movement, by engagement of the slug with the shoulder 222, rocks the lever 218 against the action of the spring 219 and causes the tail 224 to enter a notch 228 in the forward end of the slug. At the same time the nose 220 is raised to clear the flange 214 so that the slide 210 may move rearwardly. If at this time the operator's key is in proper position so that the lever 186 may be rocked by the roller 196 the slug may enter the machine to the full required extent. If, however, the operator's key is not in position it will be evident that the slug will be arrested slightly beyond the position illustrated in Figures 22 and 24. After motion of the slide 210 starts, the nose 220 is held counterclockwise as indicated in Figure 25 by the flange 214 so that reverse clockwise movement of lever 218 is prevented.

The shaft 36 carries a pair of cams 230 and 232. These cams act respectively on the follower rollers 234 and 236 carried by bell cranks 238 and 240 secured to the hub 244 mounted on a fixed shaft. These bell cranks have pivoted to them through a pin 242 a pair of links 246 and 246', the upper ends of which are pivoted at 248 individually to a pair of plates 250 and 250' secured to a rock shaft 252 and joined by a rod 260. The cams 230 and 232 are designed to drive the connections just described positively in both directions of oscillation of the shaft 252.

Pivoted freely on the shaft 252 are a series of members 254, each of which is provided with a yielding connection to the rod 260 through the medium of an individual spring 258 connected at one end to the rod 260 and at the other end to a stud 256 carried by its corresponding member 254. The rod 260 passes through the arcuate slots 262 in the members 254.

Each of the members 254 is provided with equally spaced teeth 263. A lever 264 pivoted on a fixed pin 266 is arranged to be rocked by a roller 292 carried by the cam 232. A plate 268 provided with a rearwardly turned flange 269 extends transversely of the toothed portions of the members 254 and is pivoted on the pin 266 independently of the member 264. A strong compression spring 270 urges the plate 268 in a counterclockwise direction, as viewed in Figure 12, relative to the member 264 into engagement with a lug 265 carried by the latter. The action of the roller 292 on the member 264 lags the action of the cam 230 on the roller 234 with the result that after the members 254 are moved and come to rest the flange 269 is forced between their teeth to hold them in adjusted position.

Each of the members 254 carries a series of type elements 274 equidistantly spaced thereon to correspond with the angular spacing of the teeth 263. A link 276 pivoted at 278 to each of the members 254 and urged downwardly by an individual leaf 280 of a comb-like spring member 281 is provided with lower and upper points 282 and 284, respectively, at its forward end. When the machine is in initial position the former points rest on a transverse member 283 of a member 287 as indicated in Figure 12. The members 276 are guided in their strokes in individual slots 285 in the member 287. Located transversely above the members 276 is a block 286 provided with serrations 288, the function of which will be more fully described hereafter. It will suffice at the present time to point out that upward projections 290 selectively located on the plates 89 and 90 of the slugs serve to cam the members 276 upwardly into the notches 288 whereby they are arrested at predetermined positions.

The roller 292 carried by the cam 232 is arranged to be engaged by a detent 294 pivoted at 296 and urged clockwise as viewed in Figure 12 by a spring 298 to prevent reverse rotation of the shaft 36 after it reaches its illustrated rest position.

A link 300 connects the bell crank 240 to a transverse rod 301 which joins side plates 302 and 304 of a rocking frame having a hub 307 journalled on a shaft 306 secured in the machine frame. In the upper end of this rocking frame there is journalled a feed roller 310 to which is secured a ratchet 312 arranged to be operated upon rocking of the frame by a pawl 314 pivoted at 316 and urged upwardly into contact with the ratchet by a spring 318. A detent 320 controlled by a spring 322 prevents reverse rotation of the ratchet and feed roller. An idler roller 324 is mounted in a plate 326 and cooperates with the feed roller 310. The plate 326 is pivoted at 327 to the rocking frame and is urged downwardly by a spring 330. An ear 328 may be grasped by the operator to raise the plate 326 for the insertion of a strip of carbon paper and a record tape.

The record tape, which will be described more fully hereafter, is fed through a guideway 332 and over a depending skirt 334 in front of a pair of rods 336 and 338 and thence over the feed roller 310 between it and the idler roller 324. A carbon paper strip is fed along the guide chute 340 in front of the paper tape.

Figure 5:
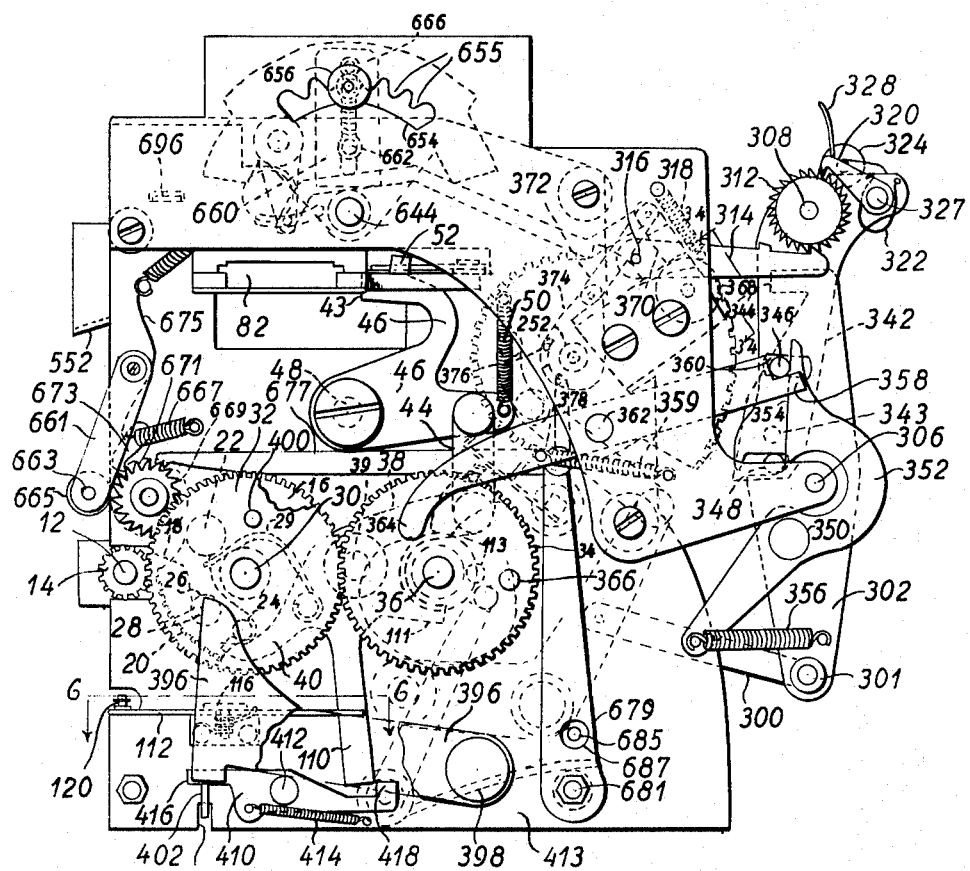
Figure 5 is an end elevation of the operating mechanism as viewed from the seller's right.

A hammer 342 is pivoted at 343 in the rocking frame and carries at its upper end a platen 344 adapted to press the paper record tape against the carbon paper strip and various type faces as will be described in detail hereafter. The hammer 342 carries a pair of pins 346 and 348, respectively, above and below the pivot 343. A lever 352 is pivoted to the rocking frame at 350 and is provided with a face 354 which, as indicated in Figure 5, rests against both pins 346 and 348 under the action of a spring 356, the hammer being normally definitely positioned by this engagement of the lever with both pins. A lever 358 pivoted to the machine frame at 362 is provided with a notch 360 at its rear end providing a seat for the pin 346. This lever 358 is urged counterclockwise as viewed in Figure 5 by a spring 359 which locates its tail 364 in the path of a pin 366 carried by the gear 34.

Figure 7:
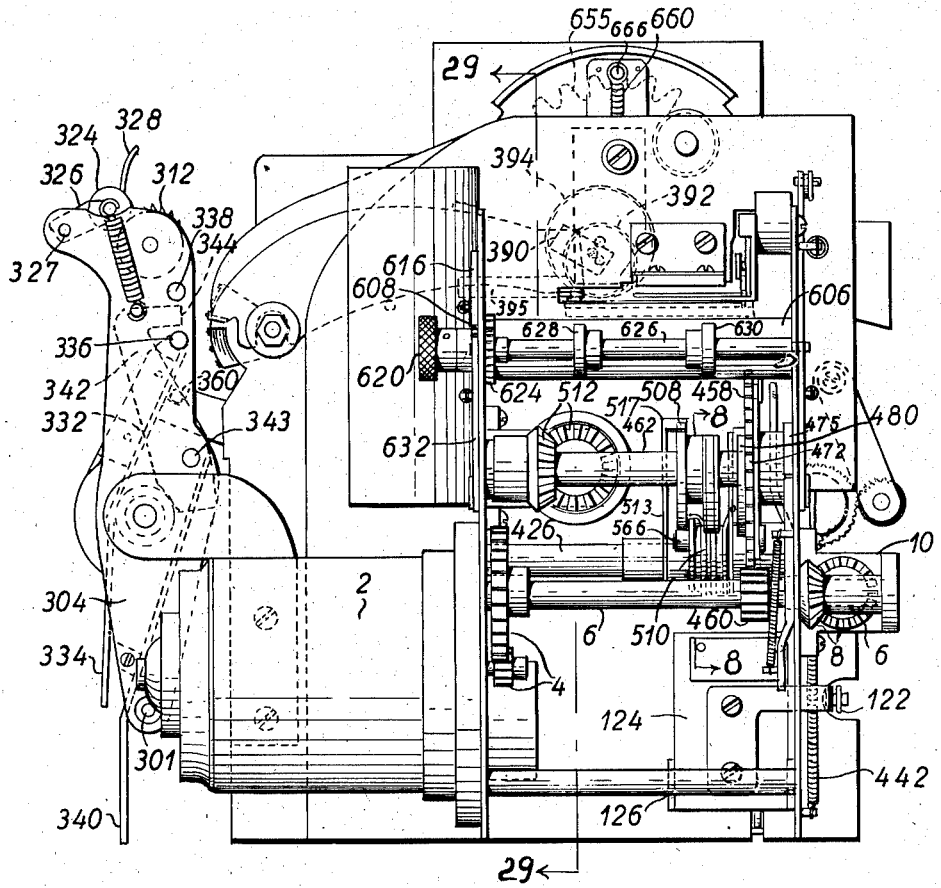
Figure 7 is an end elevation looking at the operating mechanism from the operator's left.

A numbering head 368 of conventional type is adapted to be actuated by the rocking of a lever 370 through a link 372 connected to a plate 374 which is journalled on the shaft 252 previously described. A pin 376 carried by the plate 250' extends through a slot 378 in the adjacent frame plate into an opening 380 in the plate 374. Accordingly, every time the members 250 and 250' are rocked, an oscillation is imparted to the lever 370 to advance the numbering head. A link 382 connects the lever 370 with an arm 384 carried by a rock shaft 385 which, through a gear segment 386 and a double segment 388, rocks a yoke 390 of a second numbering head 392 (Figure 7) arranged to imprint a serial number on the ticket. Adjacent to the numbering head 392 are a series of rotatable type carriers 394 arranged to print on the ticket the month and day of its date of issue. A fixed plate 395 prints on the ticket the year of issue and also the identification of the machine, the latter being printed on the leading portion of a coupon area subsequent to that being issued in a cycle.

A lever 396 pivoted at 398 to the frame is arranged to be engaged by a pin 400 carried by a gear 32 to depress the end of a bar 402 pivoted at 404 (Figure 9) to a depending arm 406 of a multiple armed lever 407. The bar 402 extends through a notch 409 in a frame plate 413 and is provided with a shoulder 408 which latches on the plate. A spring 411 urges the bar 402 upwardly and to the left as viewed in Figure 3.

Figure 10:
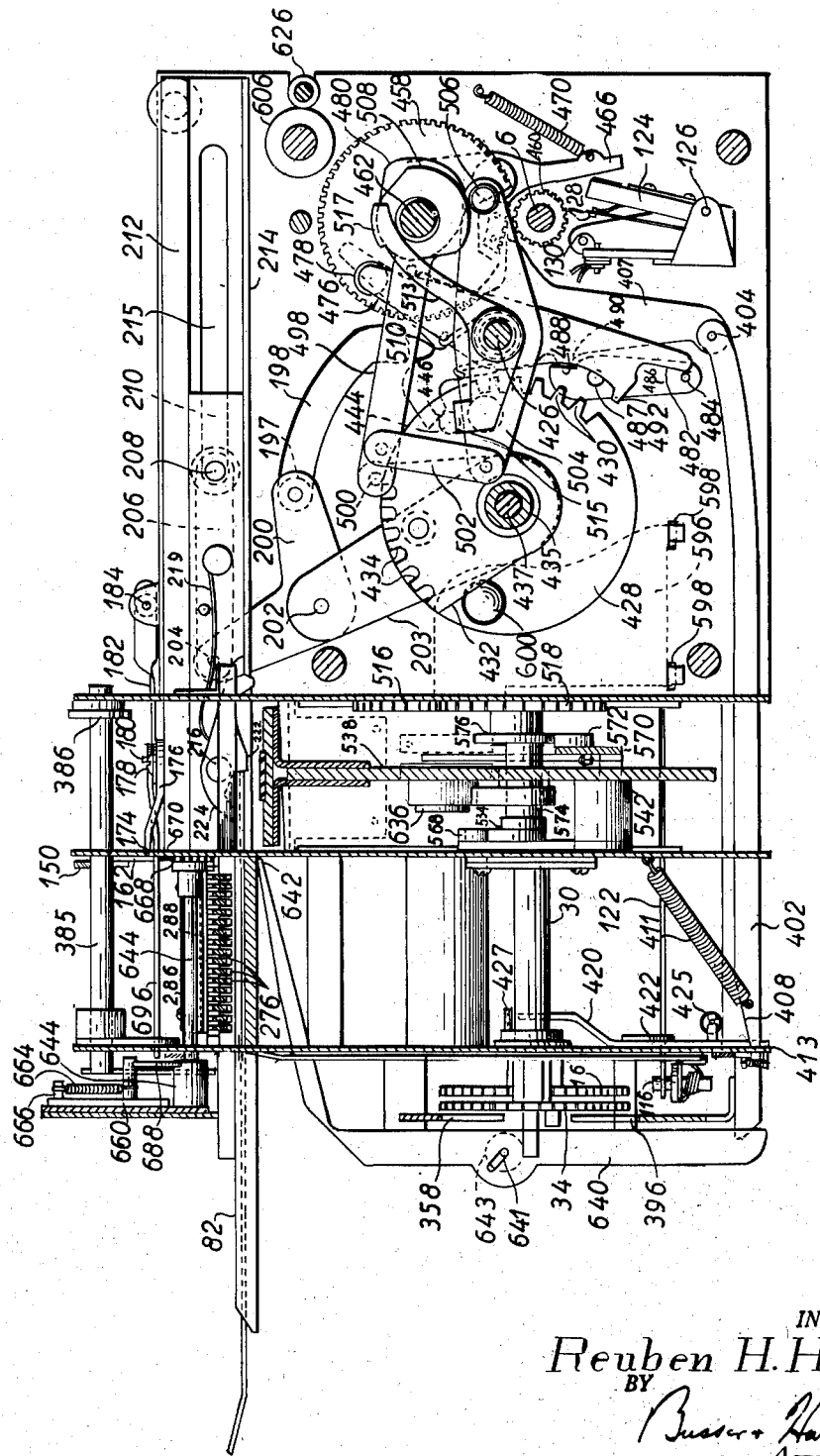
Figure 10 is a vertical section taken on the plane indicated at 10—10 in Figure 1.

Overlying the free end of the bar 402 is the nose 416 of a lever 410 pivoted at 412 to the frame and urged counterclockwise as viewed in Figure 5 by a spring 414. The rear end of this lever is provided with a shoulder 418 arranged to act as a detent for the depending arm 110 of the lever 38. As indicated in Figures 10 and 12 a lever 420 pivoted to the frame at 422 is provided with a lower end 424 arranged to underlie the rod 402. A spring 425 urges the lever 420 into position to restrain downward movement of the rod. A pin 427 carried by the shaft 30 is arranged to engage the upper end of this lever at the proper time to release the rod 402.

The lever 407 is pivoted on a shaft 426.

The lever 263 to which reference has previously been made is secured to a disc 428 and, through a hub 435, to a sector 429, the former of which is provided with teeth 439 and the latter of which is provided with teeth 434. The hub 435 is journalled on the shaft 437. The disc 428 carries a roller 436 which, as illustrated in Figure 3, is under rest conditions seated in a socket in the end of a lever 438 pivoted at 440 and urged in a clockwise direction by a spring 442, the roller extending through an arcuate slot 439 in a frame plate.

A pin 444 carried by the disc 428 is engaged by a second arm 446 of the lever 407. The edge 448 of a third arm of the lever 407 is arranged to engage the pin 450 of a gear segment 452 pivoted at 454 to a gear 453 and urged outwardly by a spring 456. The gear 458 is interrupted at the location of the segment 452 to provide a clutching action in conjunction with a pinion 460 carried by the shaft 6. This gear clutch arrangement is substantially the same as that previously described. The gear 458 is secured to a shaft 462.

Figure 9:
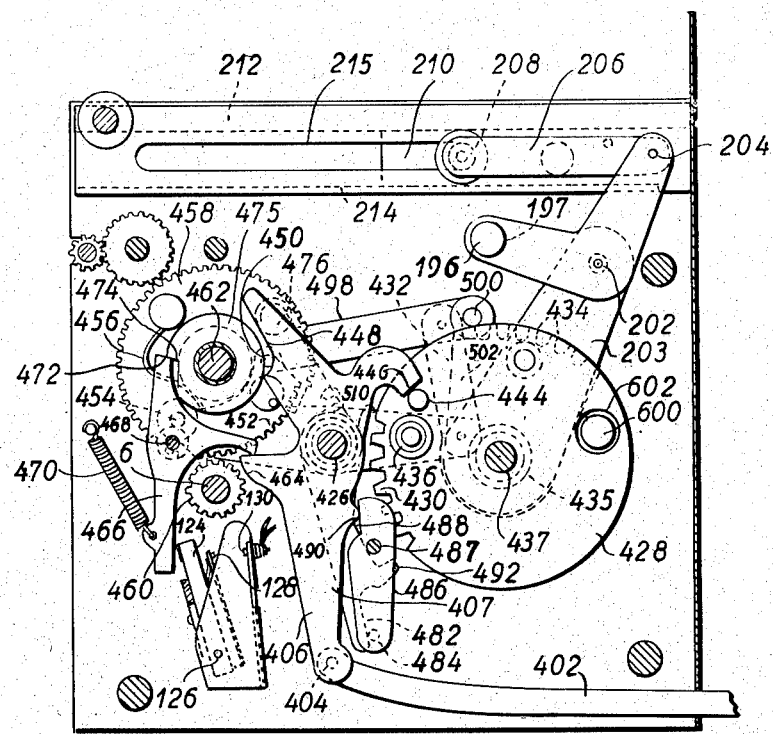
Figure 9 is a partial vertical section taken on the plane indicated at 9—9 in Figure 1.

A fourth arm 464 of the lever 407 engages an arm of a lever 466 pivoted to the frame at 468 and urged clockwise as viewed in Figure 9 by a spring 470 to bring its end 472 into cooperative relationship with a shoulder 474 on a cam member 475 carried by the shaft 462. The arrangement just described provides a detent to prevent reverse movement of the shaft.

Pivoted on the shaft 426 is a lever 476 provided at its upper end with a roller 478 arranged to follow a cam 480 carried by the shaft 462. The lower end 482 of the lever 476 is arranged to engage a pin 484 carried by the lower end of a lever 486 pivoted at 487 to the frame of the machine and having a face 488 adapted to bear against a nose 490 on the lever 407. The lever 476 is provided with a projecting portion 492 adapted to enter between the teeth 430 on the disc 428.

Figure 8:
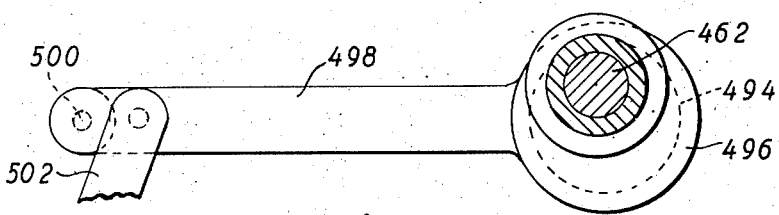
Figure 8 is a fragmentary vertical section taken on the plane indicated at 8—8 in Figure 7 and, in particular, showing an eccentric drive involved in the movement of a slug.

The shaft 462 carries an eccentric 494 (Figure 8) surrounded by a strap 496, the arm 498 of which carries a pin 500 arranged for engagement with the teeth 434 of the sector 432. A link 502 connects the arm 498 to one end of a rocker 504 journalled on the shaft 426, the other end of which carries a follower roller 506 operated upon by the cam 508. The eccentric and this cam 508 cooperate to provide to the pin 500 a somewhat elliptical motion serving to drive the sector 432 and its connected parts step-by-step, following their displacement, back to initial position. It may be here noted that the slot 198 is so shaped that in guiding the pin 196 a proper step-by-step motion is imparted through the link 206 to the slide 210 to position the slug accurately for successive printing operations on the ticket.

A spring 510 surrounding the shaft 426 reacts between the lever 476 and the rocker 504 to urge the rollers carried by them into contact with their respective cams.

The lever 513 is pivoted on the shaft 426 and is provided with turned ends 515 and 517, respectively, overlapping the upper edge of the lever 504 and the cam 508, the arrangement being such that, under the action of the cam 508, the lever 504 is at the proper times held in counterclockwise position in positive fashion.

The shaft 462 drives through a pair of bevel gears 512 the shaft 514 which controls the advance of the ticket stock and the printing thereof.

The shaft 514 is provided with a gear 516 meshing with a gear 518 to drive a shaft 520 which is provided with various cams as described hereafter. The shaft 514 also carries the driving element of a Geneva mechanism which through the driving pin 522 and the locking segment 524 intermittently drives and locks the driven element 526 of the Geneva mechanism which is connected to a shaft 528 carrying pin wheels 530 with ticket strip feeding pins 532. A suitable clamping member 533, urged downwardly by a spring 535 cooperates with a group of fixed guide plates 537 located at the sides of and between the pin wheels to lead the ticket strip about the pin wheels which advance the strip through the printing and severing mechanism.

A cam 534 on the shaft 520 is arranged to act upon a roller 536 carried by a platen carrier 538 which is mounted for vertical movement by levers 540 and 542 pivoted to it at 544 and 546 and at their other ends pivoted to the frame. The platen carrier supports at its upper end a pair of yielding impression platens 548 and 550 which are arranged to force the ticket strip and a carbon paper against various type faces to produce printing. The printed ticket is issued over a table 552 and the severed ticket is adapted to be yieldingly held on this table by a spring finger 554 carried by a shaft 556 mounted in the frame and urged toward clamping position by a helical spring 558. A pin 560 carried by the shaft 556 is arranged to be engaged by the down-turned end 562 of the slidable member 170 referred to previously.

A shaft 564 is provided with an arm 566 carrying a roller 568 engageable by a cam 574 on the shaft 520. A second arm 570 carried by the shaft 564 extends forwardly and is provided with a cam following roller 572 adapted to be acted upon by another cam 576 on the shaft 520. The arrangement of the cams and followers is such that the shaft 564 is positively moved in both directions of oscillation to effect positive cutting and withdrawal by the knife.

Figure 11:
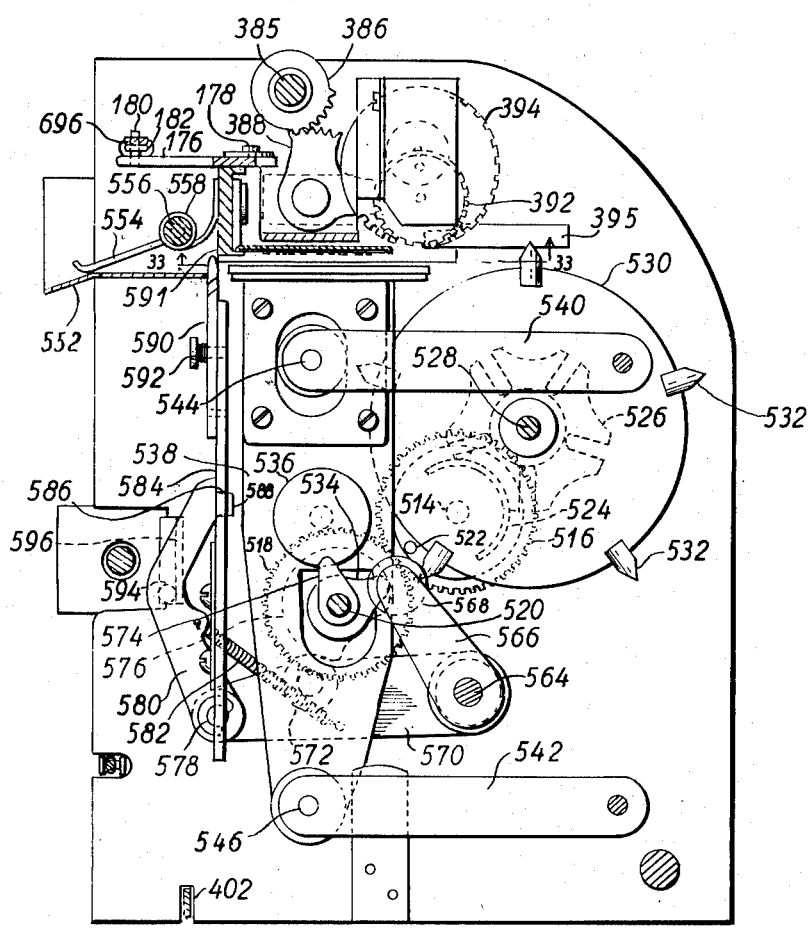
Figure 11 is a vertical section taken on the plane indicated at 11—11 in Figure 1.

The arm 570 has pivoted to its forward end at 578 a link 580 which is urged clockwise as viewed in Figure 11 by a tension spring 582. A slide 584 mounted in vertical guideways in the frame is provided with an opening 586 into which there may project an end 588 of the link 580. A movable knife 590 is carried by the slide 584 being held in engagement with a fixed blade 591 by means of a spring 592.

The link 580 carries a laterally projecting pin 594 which overlaps a plate 596 pivoted by ears 598 in openings in the frame. The plate 596 carries a pin 600 which has a rounded conical end arranged to enter an opening 602 in the disc 428, its rounded form providing for its camming by the edge of the opening 602 as the disc 428 is forcibly moved. When the pin 600 is thus cammed outwardly the plate 596 is rocked to withdraw the end 588 of the link 580 from the opening 586 in the slide 584. The knife is thus disconnected from its actuating means with the result that the actuating means may oscillate without moving the knife.

A shaft 604 journalled in the frame carries a roller 606 and a ratchet 608 which is arranged to be advanced by a pawl 610 urged toward ratchet-engaging position by a spring 612 and mounted upon an eccentric pin 614 carried by the shaft 462. As the shaft 462 revolves, step-by-step advancing movements are imparted to the roller 606, reverse movements being prevented by a detent 616 held in engagement with the ratchet by a spring 618. A knurled knob 620 carried by the shaft 604 makes it possible to rotate the roller 606 by hand for the purpose of starting the carbon strip.

Figure 4:
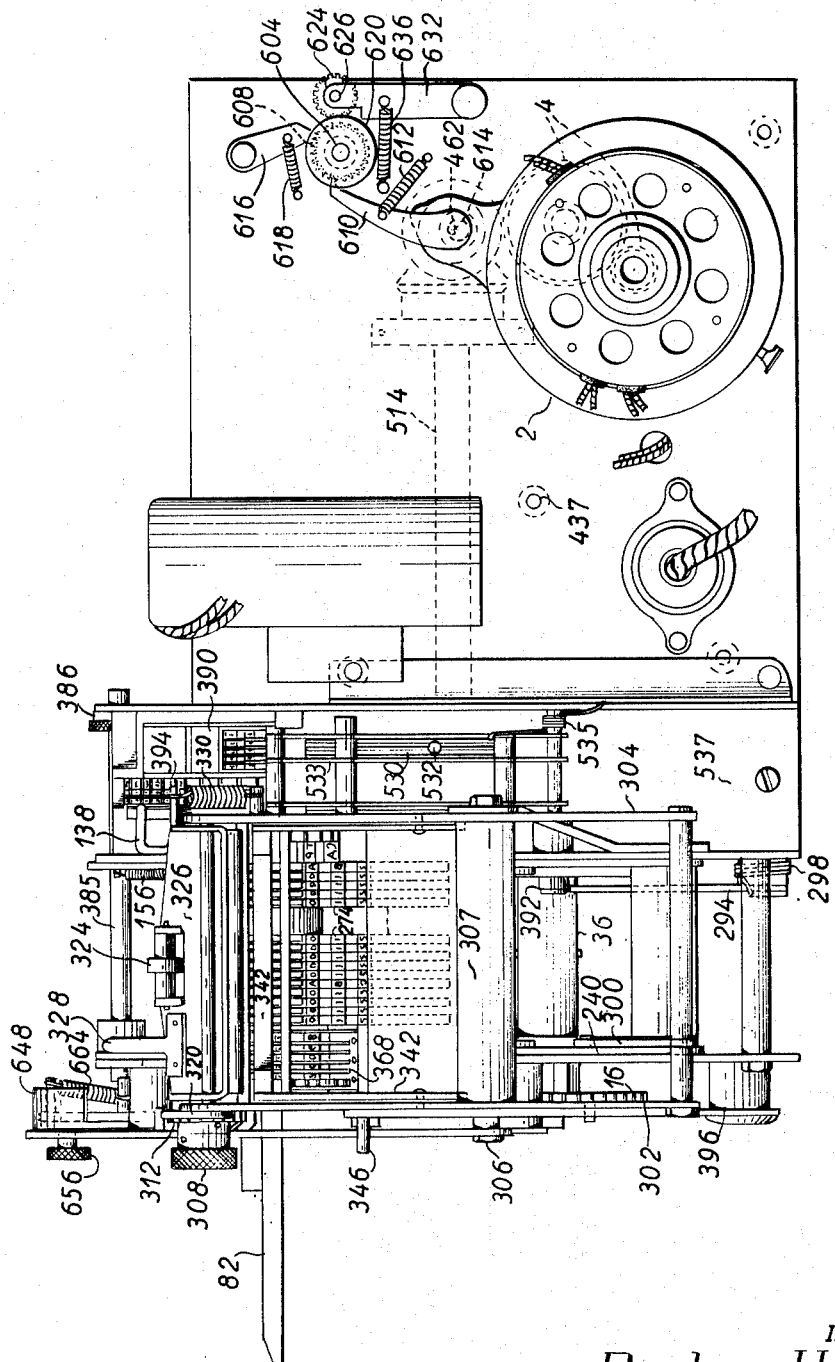
Figure 4 is a rear elevation of the operating mechanism.

A gear 622 carried by the shaft 604 meshes with a pinion 624 carried by a shaft 626 having rollers 628 and 630 thereon to nip the carbon sheet against the roller 606. The shaft 626 is carried by the upper end of levers 632 and 634, pivoted to the frame, which are urged counterclockwise as viewed in Figure 4 by springs 636 and 638.

The carbon strip is fed across the platen members 548 and 550, in a direction transverse to the direction of advance of the ticket strip, by the roller 606 and the cooperating rollers 628 and 630 from the upper end 642 of a chute 640 which is provided with sloping slots 641 mounting a roller 643 which by gravity engages the carbon strip and imparts slight tension thereto to prevent its overrunning and buckling in the region where printing is to occur.

A shaft 644 mounted in the frame supports a segmental member 646 which is provided with an arcuate flange 648 carrying certain code markings 650 which are arranged to appear through an opening 652 in a cover plate 756 of the machine housing. The frame is provided with an opening 654 having teeth 655 between which there is arranged to seat the shank of a knob 656 carried by a slide 658 which is guided by a fixed plate 660, through a slot in which there projects a pin 662 carried by the slide and pulled upwardly by a spring 664 anchored by a pin 666 carried by the member 646. The arrangement just described latches the member 646 in any one of a series of selected positions from which it may be moved by downward pressure on the knob 656 to release it from the teeth 655 and to permit it to be moved to a new position.

The shaft 644 carries a pinion 668 meshing with the rack portion 670 of a bar 672 which is provided with a second rack portion 674 meshing with a pinion 676. A pin 678 threaded into the frame holds the bar 672 in position to maintain mesh between its rack portions and their respective pinions. The shaft 644 carries a type member 680 provided with type faces 682 corresponding to the markings 650 on the member 646. The pinion 676 is secured to another type member 684 which carries type faces 686 also corresponding to the markings 650. The type faces 682 and 686 are respectively adapted to print the same code on the tickets and on the record strip.

As illustrated in Figure 26 a lever 688 pivoted to the frame at 690 is provided with an arcuate end 692 underlying the pin 662. The opposite end 694 of this lever 688 cooperates with the end of a link 696 mounted to slide in the frame and pivoted to the pin 180 carried by the bell crank 176. An interlock is thus provided to prevent rotation of the shaft 644 and change of the active type members 682 and 686 when the machine is in operation. The arrangement also serves to prevent operation of the machine if the code selector is not in a proper latched position, i. e., if the shank of the knob 656 is not properly seated between teeth 655, the end 694 of the lever 688 then will be in the path of the link 696 which as indicated hereafter will prevent operation.

A take-up mechanism is provided for the carbon paper strip which is used to print the record strip. This comprises a pair of arms 661 pivoted to the frame and mounting a shaft 663 carrying a pair of rollers 665 arranged to clamp the carbon paper against a roller 669 journalled in the frame and provided with a ratchet 671 which is prevented from reverse movement by a detent 673 acted on by a spring 675. A spring 667 urges the rollers into engagement. A pawl 677 is pivoted to an arm 679 mounted on a fixed stud 681 and having its upper end engaged within a slot 683 in the member 374 previously described. The oscillation imparted to the member 374 accordingly will produce strokes of the pawl 677 to actuate the take-up. Oscillating movements of the arm 679 are limited by the projection of a pin 685 carried by the frame into an opening 687 in the arm.

For complete locking of the machine a link 193 (Figure 3) is provided having a slot 201 embracing a pin 199 carried by the lever 192. A spring 195 normally urges the link 193 upwardly. The lower end of this link is connected to the arm 774 of the barrel lock 772 mounted in the machine housing (Figure 38). When the link 193 is locked in downward position it prevents movement of the lever 192 by insertion of a slug and hence locks up the entire machine. On the other hand, when the lock 772 is turned to open position the link 193 is raised by the spring 195 and movement of the lever 192 is permitted by the play of the pin 199 in the slot 201.

As previously indicated, each of the slugs is provided with a counter generally referred to as 102 which is advanced one step for each complete cycle of operation of the machine produced under the control of the slug. The counter accordingly keeps a record of the number of times the slug was used and this record should, of course, agree with the record of issue of tickets corresponding to the slug. For the operation of the slug counter a link 261 (Figures 12, 21, 22 and 23) is pivoted at one end to the pin 260 and at its other end to the pin 265 carried by the downturned end of a lever 267 pivoted to the frame at 269 and having an end 271 passing through an opening in the slug guideway. This lever is accordingly rocked whenever the members 254 are rocked and its end 271 serves to produce a unit advance of the counter, being withdrawn from the counter before any further movement of the slug takes place.

The counter construction is illustrated in Figure 21. It comprises a plate 697 between which and a cover plate 699 there is located a flat and compact counting mechanism. A series of wheels 698, 700, 702 and 704, carrying numerals on their surfaces, are pivoted on pins 708 fixed in the plate 697 and are secured to a group of similar ratchets 706, each provided with ten teeth, with a deep notch 709 between one pair of teeth. (A deep notch need not be provided in the ratchet associated with wheel 704, which ratchet is shown, however, as a duplicate of the others.) Detents 710 actuated by springs 712 served to prevent reverse rotation of the wheels by engagement with their respective ratchets.

A lever 714 pivoted on the pin 716 carried by plate 697 is provided with a rounded end 718 located within a corresponding opening in a pawl member 720. A single spring 722 of U-shape has its ends located in an opening 724 in the plate 697 and in an opening 726 in the pawl 720. A stop 728 limits clockwise movement of the lever 714 as viewed in Figure 21. As will be evident from examination of this figure the spring 722 not only urges the pawl 720 toward the left to engage the lever 714 with the stop pin 728 but by reason of the relative locations of the openings 724 and 726 and the pivot end 718 of the lever 714 also urges the pawl 720 in clockwise direction to cause its teeth to engage the ratchets. The pawl 720 is provided with teeth 730, 732, 734 and 736 of successively decreasing lengths. As will be evident from Figure 21 counterclockwise oscillation imparted to the lever 714 by engagement of the end 271 of lever 267 with its arm 738 will produce a right-hand movement of the pawl 720.

If the tooth 730 is engaged in one of the shallow teeth between the ratchet teeth associated with the wheel 698 the remaining teeth 732, 734 and 736 of the pawl are held away from their ratchet teeth and consequently oscillation of the lever 714 will impart an advancing movement only to the wheel 698. Successive steps are thus imparted to the wheel 698 until the tooth 730 drops into the deep notch in the corresponding ratchet. This corresponds to a position in which the numeral 9 on the wheel 698 is in view through the corresponding opening 740 in the cover plate 699. In the next advance of the wheel 698 when the transition occurs between the numerals 9 and 0 a movement is also imparted to the wheel 700 by the action of the tooth 732. If this wheel is at this time showing other than the numeral 9 the pawl will be held out so that the teeth 734 and 736 will not engage their ratchets. On the other hand, if this wheel 700 also shows a 9 at the same time as a 9 appears on the wheel 698 the tooth 732 will also be locked in the deep notch between the teeth of its ratchet and consequently the tooth 734 will be in posiion to advance the rachet associated with the wheel 702. Similarly, if the deep notch associated with wheel 702 is in position to receive the tooth 732 then the tooth 736 may engage its ratchet. The result, as will be evident, is the proper carrying operation from one order to the next whenever a transition occurs from a numeral 9 to 0. As will be evident, each complete operation of the machine with a particular slug inserted will result in the imparting of a movement to the lever 714 of the slug so that the counter carried by the slug will register the issue of a ticket through its use. The counter and its cover are sealed to the slug, for example, by welding or other sealing means so that there is prevented any reverse rotation of the counting wheels and consequently the slugs themselves maintain a record binding upon the machine operators to render them responsible for the tickets issued through its use. While the various counters could be advanced by the operators it is obvious that there would be no inducement to advance them since their responsibility for tickets would be increased and an explanation would be required.

Reference has already been made to the fixed and removable type plates 93 and 94, respectively, carried by the slugs. The type plates 93 may be spot welded to the slugs and are not intended to be removable, these type plates carrying information such as terminals or stations of departure or arrival and such other data as is not ordinarily subject to variation. The removable type plates 94, however, are secured by rivets 95 which may be in the form of extrusions from the plates expanded into holes in the slug. These type plates 94 carry changeable data such as the normal price of the ticket and the tax thereon. If the rates or the taxes change these plates may be pried off the slug and replaced by others.

The plates 89 and 90 are similarly fixed and removable, the former being spot welded to the slug and the latter being held by the ears 91 and extruded rivets 92. These plates, as previously indicated, have punched upwardly from them projections 290 engageable by the feelers 276. The projections 290 on the plates 89 are arranged to define code designations of the particular slugs and are hence individually identified with the slugs. The projections 290 on the removable plates 90, however, are used to define the fares and taxes and hence these plates are desirably replaceable if the rates or taxes change.

At this point an indication of the arrangement of the successive orders of projections 290 may be described. While it will be evident that the arrangement here involved is subject to considerable freedom of choice, in a typical instance the projections may be located in any one of ten lateral positions crosswise of the slugs. A projection in the first position engageable by a feeler 276 may cam the feeler upwardly into the first notch 288 from the left in Figure 12 to locate the corresponding member 254 in a position in which its uppermost type face 274 is below the level of the hammer 344. Accordingly, no printing will be effected, the projection in this position corresponding to the production of a blank. The next successive projections produce in order the printing of the numeral 0 to 8, inclusive, in the cases when numeral printing is to be produced, or alternatively a series of nine different letters or other symbols. If no projection is in the path of a feeler in one of the orders the feeler will move to an extreme forward position in which it engages the end of its slot with the result that in those orders in which a numeral is printed a 9 will result, with certain letters or other symbols in other orders. To summarize, the ten positions of projections 290 will afford eleven possibilities of selection.

Figure 33:
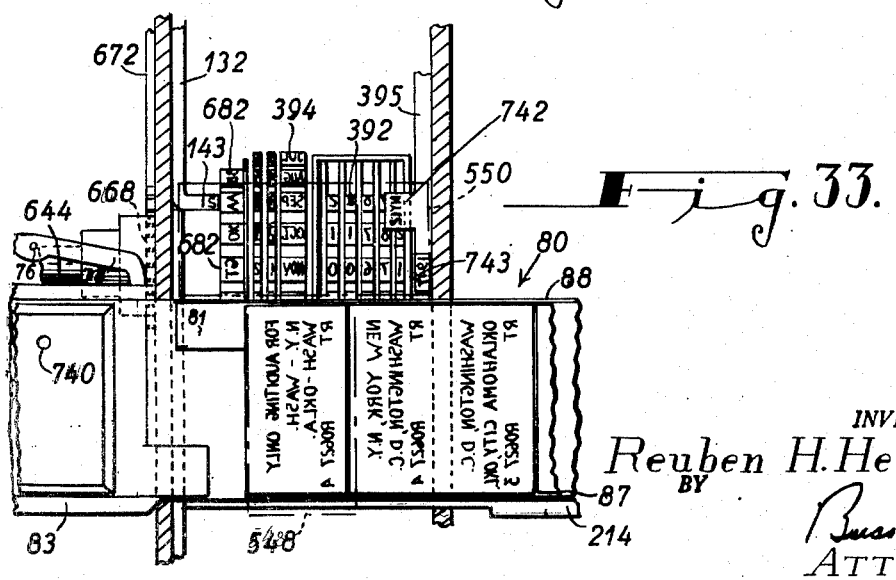
Figure 33 is a bottom plan view of the printing elements including those on a slug, viewed from the plane indicated at 33—33 in Figures 11 and 30.

The nature of the printing which occurs on the tickets and the association of ticket printing elements will be most readily understood from consideration of Figure 33 which illustrates the printing elements as presented to the face of a ticket. A slug is here indicated as in the position for the first of a series of coupon printing operations. The numbering head 392, the dating wheels 394, the code printing means 682 and the operator's key printing face 143 are here indicated. In addition to the printing effected by these there are two permanent slugs carried by the machine frame. One of these indicated at 742 carries type indicative of the station or terminal at which the machine is located and the designation of the particular machine. The slug 743 which may remain in place throughout a year of operation carries the year designation, this being replacable each year. As will be more fully referred to hereafter the slug 742 and the operator's key 132 effect printing on a coupon area which is next subsequent to that on which printing by the other elements in Figure 33 occurs. Not only does this simplify the arrangement but it also serves to provide an additional check on operation as discussed hereafter.

Figure 34:
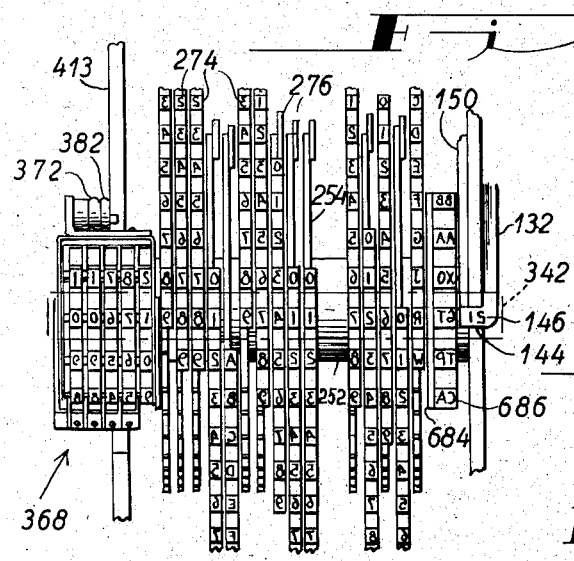
Figure 34 is an elevation of various printing elements for the record strips, viewed from the plane indicated at 34—34 in Figures 5 and 15.

Figure 34 illustrates in somewhat the same fashion as Figure 33 the arrangement of printing elements for printing a linear record on the record strip. The printing type on the operator's key is indicated at 146. The code printing device is indicated at 684, the type thereon being illustrated at 686. The numbering head is indicated at 368. The various members 254 and their printing faces 274 are also indicated in the figure. As will be noted these elements when they carry numerals, run downwardly from 0 to 9 in their type designations and may occupy positions at the time of printing in which spaces above their uppermost type faces are in the horizontal line of printing represented by the level of the printing face 146 on the operator's key 132.

Figure 32 illustrates in perspective the paths of the various paper strips involved in the machine and shows a slug 80 in printing position. The ticket strip indicated generally at S is also illustrated in Figure 35. This ticket strip may take various forms depending upon the desires of the user of the machine. As illustrated, it is of a type such as would serve the requirements of an air line for the issuance of multiple coupon tickets having transportation coupons as well as receipts. The strip S is accordingly of folded form having an upper portion S' and a lower receipt portion S''. Both are provided with openings 744 for the reception of the pins on the feeding pinwheels. The longitudinal folded edge is provided with perforations indicated at 748 to permit longitudinal tearing while the upper fold S' is provided with transverse perforations 746 running through the centers of the holes 744. These provide for transverse tearing. In the present instance the lower fold S'' is not provided with transverse perforations, this constituting the passengers receipt which is not to be severed into individual coupons. The back of the fold S' is provided with a carbon coating 750 so as to reproduce on the fold S'' the printing which is produced on the front. The back of the fold S'' may be preprinted as indicated in Figure 36 at 751 with boxes in which, on occasions, various matters may be written. There may also be preprinted hereon instructions or conditions of sale or the like. To facilitate opening of the tickets the free edge of the fold S'' preferably extends beyond the edge of the free fold S' as indicated at 752. The upper faces of both folds may be preprinted to any desired extent and provided with printed boxes in which printing may be effected by the machine.

The carbon paper strip C for printing the face of the ticket moves step-by-step transversely of the direction of movement of the ticket strip S. The ticket strip S also moves transversely of the direction of step-by-step movement of the slug 80. The carbon strip C is preferably a paper strip adapted for use only once, being discarded after it passes through the machine.

The accounting record made by the machine is produced on a pair of strips R and R', the former of which carries on its back a carbon coating 753 for the printing of the strip R'. The printing on the face strip R is produced through the use of a carbon paper D of a single use type similar to the carbon paper C. The two carbon paper strips are fed as previously indicated, being guided over sheet metal plates which, for simplicity, have not been indicated in the drawings. The record strip R is adapted to be removed from the machine by the operator at the end of his tour of duty and turned in to the accounting department. The other strip R' is to remain in the machine, accumulating therein until removed by some authorized person. The ticket and record strips may be fed either from rolls or conventional fan-folded stacks.

The operating mechanism which has been described in detail is located within a housing shown in Figures 38 and 39. The operating mechanism is contained in the upper portion of this housing which comprises a generally rectangular box having hinged covers 754 and 756 which may be locked closed by a lock 764. The tickets issue through an opening 758 aligned with the ticket trough 552. The slug entrance is indicated in Figure 38 at 82. The code adjusting knob 656 is accessible and the code designation is visible through a window 652. The accounting tape is visible through a window 762 so that the proper making of records may be observed. The openings 760 and 761 are respectively provided for the exit of the carbon paper strips D and C which may be permitted to fall therethrough, being torn off and discarded at intervals. The lock 772 previously referred to is located at the front of the machine.

The lower portion 766 of the casing is closed by a door 768 provided with a lock 770 and contains bins in which are located the supplies of ticket strip, record strips and carbon strips.

It is desirable to provide an indication of approaching exhaustion of the ticket strip and for this purpose there is located in the bottom of the housing fixed and movable contact members 776 and 778 respectively between which the end portions of a ticket strip may be inserted. These contact members are thus spaced apart to open their circuit which is energized from the low voltage secondary of a transformer 780 and contains a signal bell indicated at 782. When exhaustion of the ticket strip approaches, the contacts will engage and give a signal advising the operator of the necessity of replacing the strip.

In considering the operation of the machine there may be first reviewed the conditions which exist when the operator's key is not in the machine. Under these conditions the hook 166 of lever 162 holds the member 170 against rearward movement with the result that pin 196 is held in the notch 194 of lever 192 so that a slug cannot be inserted into the machine beyond the condition of engagement of the tail 224 of lever 218 in the slot or notch 228 near the forward end of the slug.

The same condition holds during insertion of an operator's key until the end 140 of the key clears the end 172 of the member 170, since the construction is such that before the link 150 is raised by the turned lug 144 on the operator's key to release the lever 162 from the pin 168, the end 140 of the operator's key will be located in the path of the member 170. The operator's key must accordingly be fully inserted and in contact with the pin 148 before insertion of the slug beyond the point indicated above can be effected.

Additional locking of the machine is effected through the link 193 which is held down by the key operated lock so that the upper end of the slot 197 engages the pin 199 and prevents rocking of the lever 186 if an attempt is made to insert a slug. Until the link 193 is moved upwardly complete locking is effected.

It may be noted that the variable adjustments of code designations through manipulation of the mechanism illustrated in Figure 28 and of the date may be effected whether or not the operator's key is in position. The other variables involved in a ticket are determined by the choice of the slug. A failure to have the pin 666 properly located between the teeth 655 will result in locking of the machine because the end 694 of lever 688 will be in the path of the link 696, thus preventing rearward movement of the slide 170.

Assuming that the operator's key has been properly located in the machine the events involved in the operation occur in a sequence which will now be described. It should be noted that the complete operation of the machine involves two overlapping cycles, the first of which may be called the accounting cycle which is under control of the clutch illustrated in Figures 5 and 15 and the second of which may be called the ticket issuing cycle which is under control of the clutch illustrated in Figures 9 and 10. The first of these cycles involves a single revolution of the first mentioned clutch; the second of these cycles involves one or more revolutions of the second mentioned clutch depending upon the number of ticket coupons which are to be issued to form a complete ticket.

As the slug is inserted in the machine its end 226 engages the shoulder 222 of lever 218 rocking this lever against the action of spring 219 to cause its nose 220 to clear the flange 214 of the guideway for the slide 210. In this rocking action the tail 224 enters the slot 228 in the slug, by which action the slug is prevented from being pulled away from the slide 210 until the lever 218 is again free to rock to the position indicated in Figure 24. As the further inward movement of the slug advances the slide 210 the nose 220 rides over the flange 214 so that the slug is fixedly coupled to the slide.

The movement of the slide 210 under continued inward movement of the slug rocks the arm 203, the disc 428 and the sector 432. The roller 436 forces itself out of the socket in the end of the lever 438, and the lever 438 under the action of the spring 442 then rides above the roller 436 acting as a cam to rotate the assembly including the disc 428 in the direction of its initial movement. This action may be made sufficiently strong to pull the slug the rest of the way to its final position in the machine without further action of the operator. However, as will be pointed out, whether the operator is or is not required to push the slug to its final position the tripping of the machine into operation cannot occur until the slug is actually fully inserted.

Certain preliminary events accompany the rocking of the disc 428. The pin 444 is moved from beneath the arm 446 of the lever 407. This lever, however, can have only a very slight movement until it is arrested by engagement of the shoulder 408 of the link 402 with the portion of the plate 413 of the frame above the notch 409 through which the link 402 is guided. At this time the lower end 424 of the lever 420 is located beneath the link 402 so that a positive latching action is assured. The prevention of substantial movement of the lever 407 maintains the clutch illustrated in Figure 9 disengaged.

The initial part of the movement of the disc 428 carries the opening 602 out of alignment with the rounded conical pin 600 carried by the knife control plate 596. The camming action of the disc 428 on this pin rocks the plate 596 forwardly and disengages the knife actuating member 580 from the knife slide 584.

As the roller 197 moves in the slot 198 the arm 192 of lever 186 is cammed upwardly resulting in movement of the slide 170 over the end 140 of the operator's key to prevent removal of the latter and to back it up for the printing operation. At the same time the finger 554 is raised by the rocking of its carrier 556 so as to clear the path of the ticket to be issued. The bar 696 moves over the end 694 of the lever 688 to prevent any disturbance of the code adjustment.

As the slug approaches its final position a series of events occur which may be best understood from consideration of Figures 22 to 25. The end 104 of the flange 84 engages the nose 78 of the lever 74, which has been heretofore resting against the flange 88 after being rocked by the bevel 107, rocking this clockwise to cause engagement of the hook 64 of the lever 62 in the notch 106 which is now in alignment with this hook. The nose 78 then rides on the outer edge of the flange 84 so that the hook 64 cannot become disengaged from the notch 106. The further movement of the slug carries the lever 62 with it and moves the lever 56 to disengage its shoulder 54 from the lug 52 on the upper end of the lever 46. This lug then moves into the notch 108 in the flange 84 which will be in alignment with it, this last action taking place under the action of the spring 50.

The slug is now in its final position. The distance, variable from slug to slug, between the notch 228 and the notch 108 measured lengthwise of the slug determines the displacement of the disc 428 to correspond with the number of coupon printing surfaces on the slug. As will presently appear this displacement measures the number of ticket issuing steps in the ticket issuing cycle.

The rocking of the lever 46 initiates several events. The concurrent rocking of the lever 38 releases the pin 24 to cause engagement of the clutch illustrated in Figures 5 and 15. The depending arm 110 of the lever 38 rocks away from the bevelled end 118 of the lever 112 which, under the action of spring 116, pulls the link 122 to close the switch through its action on the switch lever 124. The motor is accordingly started and through the pinion 14 and the clutch gearing rotation is imparted to the shafts 30 and 36.

The first event occurring in the rotation of the shaft 36 is the rocking of the assembly illustrated in Figure 14 by the action of cam 230 so that the pin 260 through the springs 258 will rock the members 254 thereby advancing the fingers 276. These fingers ride over the plates 89 and 90 until they engage corresponding projections 290 thereon. The riding of a finger upwardly over a corresponding projection carries it into engagement with one of the notches 283 to arrest it positively. The continued movement of the pin 260 then merely tensions the spring 258 corresponding to any arrested finger. The type numeral 274 which corresponds to the projection 290 for each finger is now in alignment with the end 344 of the hammer 342 to permit printing of the record tape.

When the members 254 are rocked the link 261 through the connection 265 rocks the lever 267 about its pivot 269 to cause its end 271 to impart one advancing step to the slug counter as previously described. As will be evident, the later reverse movement of the members 254 will withdraw the end 271 of lever 267 so that it will thereafter not interfere with outward step movements of the slug.

The movement of the pin 376 occasioned by the rocking of the plate 250' cause rocking of the arm 374 which, through the links 372 and 382, produces an advance of both of the numbering heads for the record tape and for the ticket.

When the arm 374 is rocked to advance the counters and when it is later returned to initial position a complete oscillation is thereby imparted to the lever 679 to giev a complete stroke to the pawl 677 with resulting advance of the rachet 671 and the roller 669 to take up the carbon paper strip for the recording means. Due to the fact that the rollers 665 are yieldingly held by the spring 667 against the roller 669 this take-up action is capable of involving slippage so that the paper will not be torn. The rate of advance by the take-up means, if slippage did not occur, would be somewhat greater than the rate of advance imposed by the feed roller 310 so that the carbon paper strip is advanced under slight tension.

The rocking of the levers 238 and 240 also causes a rocking of the accounting frame through the link 300. Referring particularly to Figure 5 it will be evident that the counterclockwise rocking of this frame is accompanied by a retarding of the hammer by reason of the fact that the pin 346 of the hammer is engaged in the notch 360 of the lever 358. As the counterclockwise rocking proceeds the edge 354 of the lever 352 which bears on the pin 346 is caused to have a clockwise rotation relative to the rocking frame with resultant tensioning of the spring 356. The pin 348 moves away from the edge 354 of the lever 352. The ratchet 312, held by the detent 320, clicks over the hook of the pawl 314 which yields against the action of the spring 318.

The roller 292 (Figure 12) now engages the rocker 264 causing the turned end 269 of the plate 268 to engage between teeth 263 on each of the members 254. The strong spring 270 permits the rocker 264 to move slightly beyond the position of full engagement. This positively locks the members 254 against movement in either direction and insures proper alignment of the type carried thereby for printing. Immediately upon completion of this locking action pin 366 engages the end 364 of lever 358 to release the pin 346 thereby tripping the hammer.

The action of the lever 352 on the pin 346 under the tension of the spring 356 causes the hammer to strike a sharp blow on the paper record tape and the carbon strip forcing them against the aligned type to produce a record. The arrangement of the parts is such that, when the frame is rocked to its extreme counterclockwise position as viewed in Figure 5 the static condition following tripping of the hammer and involving contact of the edge 354 of lever 352 with both of the pins 346 and 348 would position the active end 344 of the hammer somewhat spaced from the type so that the paper sheets would not be pinched between the hammer end and the type. However, in the initial operation of the hammer its inertia during its sharp forward movement will cause it to strike a heavy blow against the type, the pin 348 then moving beyond its final position to rock the lever 352 slightly against the tension of the spring 356. A rebound then occurs to the final position in which the pins 346 and 348 are both engaged by the edge 354. This hammer stroke followed by slight rebound insures the making of a clean impression which might be blurred if the hammer remained in position to pinch the paper sheets against the type.

The accounting record is now completed to record the various desired matters on the record strip, i. e., the operator's code identification, the type of sale code designation, the route code, the price, the tax, the ticket serial number and the machine code.

Immediately following this printing operation the roller 292 releases the rocker 264 which in turn releases the members 254 and the pin 366 passes the end 364 of the lever 358 so that this lever will be free to reengage the pin 346 as soon as the frame is rocked to its initial position. Also shortly thereafter the pin 400 engages the lever 396 to initiate the ticket issuing cycle. Before proceeding with a description of the ticket isuing cycle, however, the completion of the accounting cycle will be described.

Figure 15:
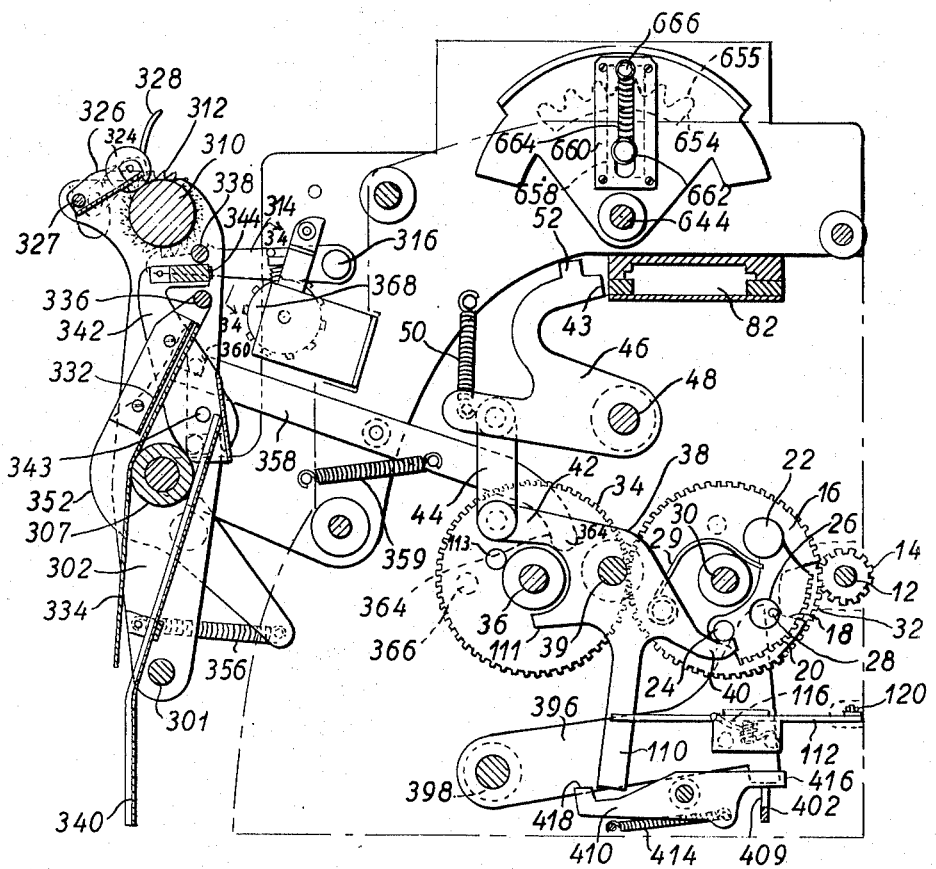
Figure 15 is a section taken on the plane indicated at 15—15 in Figure 1.
Figure 29:
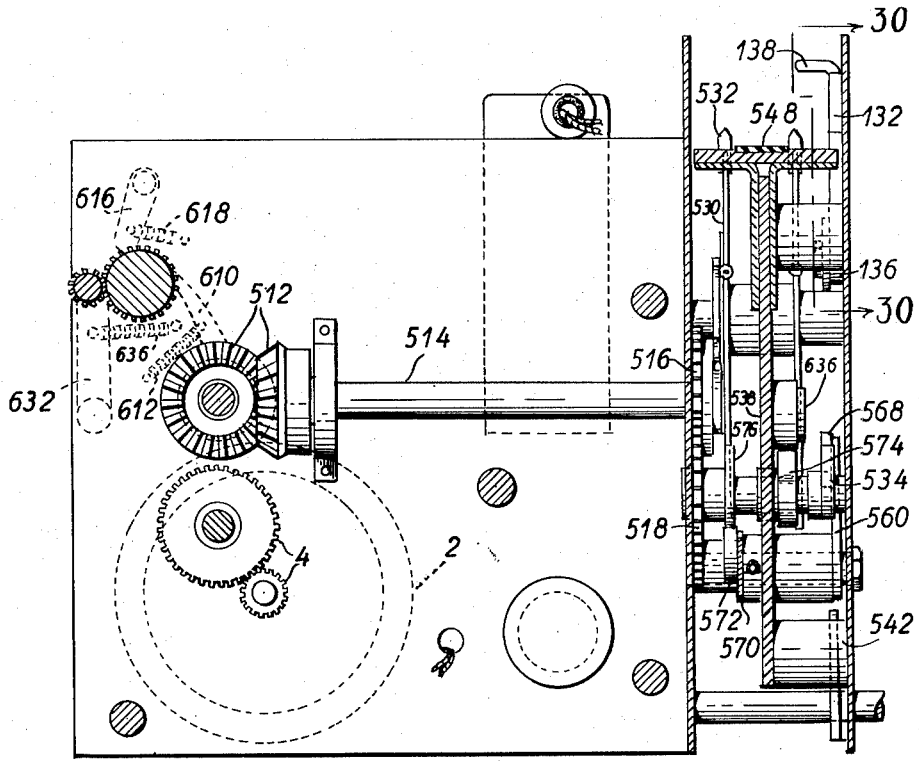
Figure 29 is a vertical section taken on the plane indicated at 29—29 in Figures 1 and 7.

The pin 113 acts upon the lever 38 to rock it counterclockwise as viewed in Figure 15 to bring it arm 40 into the path of the clutch pin 24. The continued rotation of the shaft 36 rocks the levers 238 and 240 back to their initial positions with the result that the members 254 are restored to initial positions, the fingers 276 being withdrawn from the slug. The hammer frame is also restored to its initial position and during this restoration the pawl 314 acts on the ratchet 312 to advance the record strip and the carbon paper. The hammer is finally latched by the lever 358. The pawl 677 is given a forward stroke to operate the take-up for the carbon paper. The clutch is disengaged as rotation proceeds to the position of Figure 15. The action of the depending arm 110 of the lever 38 rocks the lever 112 but as will be pointed out the switch is not disengaged, the pin 120 merely riding upwardly as viewed in Figure 6 in the loop 121 of the link 122.

Before disengagement of the clutch, the pin 113 clears the lever 38. However the lever 38 at this time cannot again rock clockwise as viewed in Figure 15 because its depending arm 110 will then have been latched by the action of the end 418 of lever 410 which will have rocked clockwise as viewed in Figure 15 at the beginning of the ticket issuing cycle as described below.

The action of the pin 400 on the lever 396 initiates the ticket issuing cycle which as indicated begins before the completion of the accounting cycle. Just before the pin 400 engages lever 396 the pin 427 carried by the shaft 30 engages the upper end of the lever 420 to remove its end 424 from beneath the bar 402. The rocking of the lever 396 presses the bar 402 downwardly so that the shoulder 408 is released from the plate 413 at the location of the notch 409 with the result that the bar 402 may move to the left under the action of both springs 411 and 510. The action of the former is direct, that of the latter being indirect in the following fashion. The spring 510 urges the lever 476 in a counterclockwise direction as viewed in Figure 9 or clockwise as viewed in Figure 10. Its tail portion 482 engages the pin 484 of the lever 486, the upper end 488 of which, in turn, engages the projection 490 on the lever 407. Since the lever 407 is now released, both by the release of the bar 402 and by the pin 444, lever 407 rocks clockwise as viewed in Figure 9 and lever 476 rocks counterclockwise.

The left-hand movement of the bar 402 as viewed in Figure 9 accompanied by the downward movement of its free end releases the lever 410 for counterclockwise movement as viewed in Figure 5 under the action of its spring 414. At the time of release, however, the arm 110 of lever 38 overlies its end 418 so that it moves only to the extent of engagement with this arm. When, however, somewhat later the arm 110 moves toward the left in Figure 5 under the action of pin 113 the lever 410 latches this arm so as to hold the lever 38 in clutch disengaging position following the passage of pin 113 until the bar 402 again moves upwardly at the end of the ticket issuing operations.

The movement of lever 407 releases the clutch control pin 450 to permit engagement of the teeth of the segment 452 with the driving pinion 460. At the same time the arm 464 of lever 407 produces counterclockwise movement of lever 466 against the action of its spring 470 to cause it to move to hold the switch closed, this switch not having been opened because the action just mentioned occurs prior to the rocking of the lever 112. The end 472 of lever 466 which previously prevented reversal of the clutch parts is moved outwardly from beneath the shoulder 474 of the member 475. It may be here noted that the prevention of reverse movement of this clutch and the prevention of reverse movement of the other clutch by the lever 294 is to avoid chattering which might otherwise occur due to backward rotation which would be effected by the springs which control the clutch segments.

The lever 476 rotates counterclockwise as viewed in Figure 9 to engage its tooth between teeth 430 of the disc 428 which have been positioned in accordance with the length of the slug. The slug is locked thereby positively in position prior to the withdrawal of the projection 52 of lever 46 from the notch 108. The slot 198 in which the roller 197 rides is so shaped as to secure accurate positions of the successive type printing plates on the slug in printing position. A direct link connection between the arm 203 and the slide 210 would not effect accurately proper positioning in correspondence with uniform indexing of the teeth 430 and the teeth 434. The auxiliary bell crank 290 cooperating with the slot 198 is accordingly provided, the slot acting as a position-correcting cam on the bell crank 200.

The events just described are promptly followed by the printing of the ticket by the quick action of cam 534 on the follower roller 536 by which the platen is pressed upwardly against the ticket strip, carbon paper and type. All of the data on one coupon is thus printed simultaneously. Immediately following this printing action of the platen it is released to drop away from the type. This drop occurs not only because of the weight of the platen carrier but because of the resiliency of the platen face which gives the platen an initial thrust.

The ticket strip is now advanced through the action of the Geneva mechanism illustrated in Figure 11. The driving pin 522 of this mechanism imparts a quick motion to the pinwheels 530 advancing the ticket strip the length of one coupon and then retaining it in definite rest position through the locking of the Geneva mechanism by the locking segment 524. At the same time the carbon paper which is used for printing the face of the ticket strip is advanced by the roller 606 through the action of the pawl 610 on the ratchet 608.

Concurrently with the above, and following the printing operation, the eccentric 494 will have advanced the pin 500 above a space between a pair of teeth 434, cam 508 will have released roller 506 so that lever 504 will rock to bring pin 500 between the teeth, and cam 508 will also have engaged turned end 517 of lever 513 to lock lever 504 in its last position to prevent, additionally to the tooth 492, any movement of disc 428 under the action of a pull on the slug. Then the cam 480, by engagement with the roller 478, rocks the lever 476 to withdraw its tooth 492 from the teeth 430, and the pin 500 acting on the teeth 434 of the sector 432 advances the assembly including the disc 428 to impart to the slug a movement to bring the next type face in printing position. This advancing action is due to the oval movement of the pin 500 imparted by the eccentric 494 and the cam 508. Immediately following this advance of the disc 428 the disc is relocked by release of the lever 476 by the cam 480, the tooth 492 reengaging the teeth 430, this locking action occurring before the next release of the teeth 434 by the pin 500. Assuming that this is not the final cycle and that another ticket coupon is to be printed the disc 428 will not have been restored to its initial position so that the pin 444 will not engage the arm 446 of lever 407, nor will the pin 600 drop into the hole 602. It is to be noted that the rocking of the lever 476 does not now affect the lever 407. The effect of non-rocking of the lever 407 is to maintain the clutch engaged and the switch closed.

Near the end of the first revolution of the clutch the cam 574 acts on the roller 568 to rock lever 570 and move the knife actuator 580 upwardly. Owing, however, to the fact that the plate 596 is held outwardly, its engagement with the pin 594 of the knife actuator holds its nose 588 out of the opening 586 in the knife slide 584. Accordingly it has an idle stroke without moving the knife, being restored to its lower position by the action of cam 576 on the roller 572.

Due to the presence of the pin 196 under the tail 192 of lever 186 the ticket clamping finger 554 remains in upper position so as not to impede the ticket strip movement.

It will be evident that the parts at the end of this first cycle are in condition to go through one or more identical cycles to print additional coupons. The final printing cycle differs from the cycle just described only in certain cycle terminating operations.

At the beginning of the final cycle the last of the coupon printing plates is in printing position and printing, advance of the ticket strip and advance of the carbon paper all take place in the identical fashion already described. This last advance of the ticket strip carries it to a position in which the desired line of severance is in alignment with the knife.

The advance of the disc 428 in this last cycle accomplishes a number of results.

The pin 444 engages the arm 446 of lever 407 rocking this lever counterclockwise as viewed in Figure 9. The counterclockwise movement of 407 through the lever 486 withdraws the tooth 492 from the teeth 430 of disc 428 despite the position of the cam 480. Lever 466 is now free to rock under the action of spring 470, so far as its engagement with arm 464 of lever 407 is concerned, but does not do so because its upper end 472 is engaged by the cam 475. The switch is accordingly held closed. The surface 448 of the lever 407 is now in position to engage the clutch pin 450 to disengage the clutch when rotation proceeds to the final position.

The movement imparted by the pin 444 to the lever 447 moves the bar 402 to the right in Figure 9 and this bar is pulled upwardly so that its shoulder 408 may again latch on the frameplate 413. Lever 410 is now released from the lower end of arm 110 of lever 38.

The first reverse movement imparted to the slug, which may have been in a previous cycle if multiple coupons are printed or which may be in the final cycle in the event a single coupon is printed, will have restored the elements 62 and 56 to the position of Figure 22 latching the lug 52 of lever 46 so that the clutch of Figure 15 will remain disengaged. This will occur, in any event, prior to release of arm 110 by lever 410.

The roller 196 is now restored to position in the notch 194 of lever 186 and this lever will effect release of the finger 554 to hold the ticket strip by bearing on the last coupon issued.

The hole 602 is now aligned with the pin 600 and consequently the nose 588 of the knife actuator 580 is engaged in the opening 586 of the knife slide. The result is that, when near the end of this last cycle the lever 570 is rocked, the knife will be moved upwardly to cut the ticket strip along the proper line and will then be withdrawn to open the path for advance of the next ticket. As the clutch rotates to its final position disengagement will occur and the cam 475 will clear the end of the lever 466 which, under the action of spring 570, will be rocked to open the switch and bring its end 472 behind the shoulder 474 to prevent reverse movement of the clutch.

The final movement of the slide 210 brings the parts illustrated in Figure 24 to the position shown therein with the result that the slug is released by the hook 224 and may be withdrawn by the operator. It will be evident that all of the parts have now been restored to their initial positions and accordingly the machine is ready to pass through another complete cycle under the control of the same or different slug.

It will be evident from the foregoing description of the machine construction and its operations that the invention is readily capable of modification to satisfy many types of ticket issuing requirements consistently with various systems of selling and accounting for the sales of tickets, but to indicate a typical use of the machine reference may be again made to Figures 35 and 37. Figure 35 illustrates the ticket strip S with portions indicated severed from each other but in the order of issue. There is represented, in particular, the last issue for sale of a ticket during one operator's tour of duty followed by the issue of a closing ticket to him and an opening ticket to the next operator of the same machine. These are respectively indicated at T, T' and T''. T₃ indicates the forward end of the ticket supply strip remaining in the machine following the issue of the opening ticket T''. Figure 37 represents the records made of the issue of tickets by the first operator, including his opening and closing tickets and the issue of the opening ticket of the next operator and the first sale made by the latter. The ticket T consists of five coupons issued in a single operation of the machine, this ticket as illustrated being for a round-trip from New York to Oklahoma City by way of Washington. The first and uppermost coupon of this ticket represents a coupon to be retained by the ticket seller for auditing purposes. The next four coupons represent the individual coupons for the four individual flights making up the round-trip. The matters indicated in the coupon space 784 in each of these are printed by the type faces on the slug. It will be noted that these coupons in the spaces 784 indicate either the terminals of the individual flights or the notation indicative of the auditing coupon. They also contain the code number "RO627" indicative of the particular trip involved, the code designation "RT" indicating round-trip and the coupon numbers 1, 2, 3 and 4, and on the auditing stub the number 4 indicative of the fact that the ticket issued to the passenger consists of four coupons. The last coupon contains additionally the gross fare. It will be understood that all of these matters are merely examples, since the printing faces on the slug may contain whatever matter is most desirable to the user of the machine.

On each coupon the year is printed at 786, the month and day at 790 and at 792 the code which may indicate the nature of the sale. This in particular might represent some special sale which would change the price of the ticket, for example, a ticket issued for government travel which might be tax exempt.

At 788 is the serial number of the ticket which, it will be noted, appears the same on each coupon thereof.

794 is the printed entry representing the place of sale and the number or other designation of the machine, this being printed by plate 395 on the leading portion of a coupon area following the last being issued in a cycle of operation. 796 is the record made from the operator's key indicating the seller of the ticket.

The record strip entries may be described with reference to the columns in Figure 37 as follows:

At 798 there is indicated the record of the operator made by his key.

At 800 is the code record of the type of ticket issued.

At 802 is the record made, as determined by the projections 290 on the slug, of the designation of the type of ticket as to its route or the like.

At 804 is the gross amount (price plus tax) of the ticket and at 806 is the tax, both of these being determined also by projections 290 on the slug.

At 808 there is indicated the serial number of the ticket issued. It will be noted that this serial number will correspond to the number printed on all of the coupons of each ticket. Similarly the entry at 802 may correspond to the code designation printed in the spaces 784 by the slug.

The entry for the ticket T will be found at 814 in Figure 37. This may be assumed to be the last ticket issued during the tour of duty of the operator whose key number is 21.

Before going off duty the operator will issue to himself a closing ticket T' by the use of a special slug which may be tied up to the particular machine and may be called an "opening-closing" slug. The ticket thus issued bears the next serial number in order and carries the date and data corresponding to the matter on the slug as well as other entries as indicated including the operator's number and a code designation such as AA indicating that this is an auditing ticket. This ticket may be turned into the proper authority. It may be noted that this last issue of a ticket by operator 21 will imprint his number on the end of a ticket strip as he leaves it, i. e., on the next illustrated ticket T''.

The entry on the record strips is indicated at 816. The operator who is leaving the machine may then open the covers and tear off the portion of the upper record strip representing his tour of duty. He can then make entries at 810 and 812 indicating when he went on duty and when he went off duty.

The first operation of ticket issuing by the next operator on duty will be the issue of a similar opening-closing ticket to himself as indicated at T''. This will bear the number of the previous operator illustrating the continuity of their tours of duty. The entry at 818 is the one made on the record strips by this operation.

This operation leaves in the machine as the first coupon to be issued that indicated at T₃ which, it will be noted, bears before its issue the number of the new operator. The issuance of tickets may then be carried out in ordinary fashion, this new operator likewise at the end of his tour of duty removing the portion of the record strip corresponding to his sales, the duplicate in each case remaining in the machine.

The foregoing type of operation may, of course, be modified in various ways depending upon the desires of the user of the machine. As an example of an alternative system of operation there may be cited a type of operation involving the use of the same machine by a number of ticket sellers through the same periods of operation. In such case the opening and closing coupons may be dispensed with and the printing of the seller's code on the tickets may be eliminated. In this case, however, there may be provided in each ticket a coupon to be removed and retained by the seller, these coupons constituting audit stubs. It will be noted that by reference to the record strip made in the machine all of the ticket coupons and all of the audit stubs relating thereto may be identified with the seller because the serial number of each coupon and stub will be tied up with the seller's code on this record strip. The audit stubs may have the prices printed thereon so that the total sales may be determined by addition of the prices on the stubs. These should, of course, agree with the record made in the machine.

It will be evident that other variations may be introduced in the system of operation with minor changes in the machine construction.

What I claim and desire to protect by Letters Patent is:

1. A ticket issuing machine comprising means for advancing a ticket supply strip, means for printing areas of said strip, means for printing a record corresponding to the printing of said areas, means for effecting a record printing cycle of operation of the machine, means controlled in said cycle to effect a cycle of operation of the machine to print a plurality of ticket areas, and means for severing the printed areas from the supply strip as a single ticket at the end of the last mentioned cycle.

2. A ticket issuing machine comprising means for advancing a ticket strip during a single complete cycle of operation through a distance corresponding to the length of a plurality of coupon areas thereon to issue a ticket having such areas, said coupon areas being issued in a corresponding series of sub-cycles of operation included in said complete cycle, means controlled by the size of a slug insertible in the machine to determine the number of sub-cycles of the machine performed during a complete cycle, the number of sub-cycles being variable with the size of the slug, means for severing the ticket strip, and means controlled by the slug for effecting severing action of said severing means only upon issue of the last coupon of a series constituting a ticket.

3. A ticket issuing machine comprising means for advancing a ticket strip during a single complete cycle of operation through a distance corresponding to the length of a plurality of coupon areas thereon to issue a ticket having such areas, said coupon areas being issued in a corresponding series of subcycles of operation included in said complete cycle, means controlled by the size of a printing slug insertible in the machine to determine the number of sub-cycles of the machine performed during a complete cycle, the number of sub-cycles being variable with the size of the slug, means for effecting variable printing of the coupon areas of a ticket by printing surfaces on the slug, means for severing the ticket strip, and means controlled by the slug for effecting severing action of said severing means only upon issue of the last coupon of a series constituting a ticket.

4. A ticket issuing machine comprising means for initiating a cycle of operation, means for automatically intermittently advancing a ticket supply strip a plurality of times during a single cycle of operation to bring successive coupon areas thereof to a printing position while said areas are attached together, means for receiving a slug having a plurality of printing faces thereon, means for automatically intermittently advancing the slug a plurality of times during the same single cycle of operation to bring successive printing faces to the printing position, and means for effecting printing operations by the slug between advances of the ticket strip and the slug to print successive coupon areas of the ticket strip by successive printing faces of the slug.

5. A ticket issuing machine comprising means for initiating a cycle of operation, means for automatically intermittently advancing a ticket supply strip a plurality of times during a single cycle of operation to bring successive coupon areas thereof to a printing position while said areas are attached together, means for receiving a slug having a plurality of printing faces thereon, means for automatically intermittently advancing the slug a plurality of times during the same single cycle of operation to bring successive printing faces to the printing position, means for effecting printing operations by the slug between advances of the ticket strip and the slug to print successive coupon areas of the ticket strip by successive printing faces of the slug, and means for thereafter automatically severing during the same cycle of operation the ticket thus printed from the supply strip.

6. A ticket issuing machine comprising means for initiating a cycle of operation, means for automatically advancing a ticket supply strip during a single complete cycle of operation through a distance corresponding to the length of a plurality of coupon areas thereon to bring successive coupon areas to a printing position while said areas are attached together, means for receiving a slug having a plurality of printing faces thereon, means for automatically advancing the slug during the same cycle of operation to bring successive printing faces to the printing position, and means for effecting printing operations on the ticket strip by the printing faces of the slug to print successive coupon areas of the ticket strip by successive printing faces of the slug.

7. A ticket issuing machine comprising means for initiating a cycle of operation, means for advancing a ticket supply strip during a single complete cycle of operation through a distance corresponding to the length of a plurality of coupon areas thereon to bring successive coupon areas to a printing position while said areas are attached together, means for receiving a slug having a plurality of printing faces thereon, means for advancing the slug during the same cycle of operation in a direction substantially parallel to the face of the ticket strip and transverse to its direction of advance to bring successive printing faces to the printing position, and means for effecting printing operations on the ticket strip by the printing faces of the slug during said cycle of operation to print successive coupon areas of the ticket strip by successive printing faces of the slug.

8. A ticket issuing machine comprising means for initiating a cycle of operation, means for advancing a ticket supply strip past a printing position during each cycle of operation, means for receiving a slug having a plurality of printing faces thereon, means for advancing the slug during each cycle of operation in a direction across the face of the ticket strip and transverse to its direction of advance to bring successive printing faces to the printing position, means for effecting a plurality of printing operations by the slug to print a portion of the ticket strip by successive printing faces of the slug, and means for thereafter severing during the same cycle of operation said printed portion from the supply strip.

9. A ticket issuing machine comprising means for initiating a cycle of operation, means for automatically advancing a ticket strip during each cycle of operation, means for automatically advancing during a cycle of operation in a direction across the face of the ticket strip and transverse to its direction of advance a member having a plurality of printing faces thereon, and means for effecting during said cycle of operation successive printing operations by said printing faces on successive areas of said strip.

10. A ticket issuing machine comprising means for initiating a cycle of operation, means for automatically advancing a ticket strip during each cycle of operation, means for automatically advancing during a cycle of operation in a direction across the face of the ticket strip and transverse to its direction of advance a member having a plurality of printing faces thereon, means for advancing in a direction transverse to the advance of the ticket strip and between the ticket strip and the printing faces of said member an ink-carrying strip, and means for effecting during said cycle of operation a plurality of impressions of said printing faces on said ticket strip through the ink-carrying strip so that successive printing faces print successive areas of the ticket strip.

11. A ticket issuing machine comprising means for advancing a ticket supply strip past a printing position, means for receiving a slug having a printing face thereon, an additional printing mechanism for printing on said ticket strip, means for effecting simultaneous printing on said strip by the printing face on the slug and said printing mechanism, a separate mechanism for recording on a record strip, and manually controlled selective mechanism for simultaneously and correspondingly adjusting said printing and recording mechanisms.

12. A ticket issuing machine comprising means for advancing a ticket supply strip, means for printing an area of said strip, means for printing a record corresponding to the printing of said area, means for effecting a record printing cycle of operation of the machine, means controlled in said cycle to effect a subsequent ticket area printing cycle of operation of the machine, and means for severing the printed area from the supply strip at the end of the last mentioned cycle.

13. A ticket issuing machine comprising means for advancing a ticket supply strip, an accounting mechanism, means for receiving a slug having printing means thereon and provided with elements occupying various positions to correspond with the printing means, means controlled by said elements for variably controlling said accounting mechanism, means for effecting an accounting cycle of operation of the machine, means controlled in said accounting cycle to effect a second cycle of operation of the machine, means for effecting printing of an area of the ticket strip by the printing means on the slug during said second cycle, and means for severing the printed area from the supply strip at the end of said second cycle.

14. A ticket issuing machine comprising means for advancing a ticket supply strip, an accounting mechanism, means for receiving a slug having a plurality of printing means thereon and provided with elements occupying various positions to correspond with the printing means, means controlled by said elements for variably controlling said accounting mechanism, means for effecting an accounting cycle of operation of the machine, means controlled in said accounting cycle to effect a second cycle of operation of the machine, means for effecting printing of successive areas of the ticket strip by the successive printing means on the slug, and means for severing the printed areas from the supply strip as a single ticket at the end of said second cycle.

15. A ticket issuing machine comprising means for advancing a ticket strip, means for receiving a slug having a plurality of printing means thereon and a counter, means for effecting a plurality of successive printing operations on successive areas of said ticket strip by different printing means on the slug, and means for advancing the slug counter only once in a cycle in which such successive areas of the ticket strip are printed by the different printing means on the slug.

16. A ticket issuing machine comprising means for advancing a ticket strip, means for receiving a slug having printing means thereon and provided with elements occupying various positions to correspond with the printing means, an accounting device, feeler means for controlling said accounting device, said elements comprising projections arranged to act as cams on said feeler means, means for positively arresting in selected positions the feeler means cammed by said projections, and means for effecting printing of said ticket strip by said printing means.

17. A ticket issuing machine comprising means for advancing a ticket strip during a single complete cycle of operation through a distance corresponding to the length of a plurality of coupon areas thereon to issue a ticket having such areas, means for effecting printing successively on said coupon areas during the cycle of operation, and means for effecting partial printing of the first coupon area of the ticket strip following the ticket issued in a cycle of operation simultaneously with the printing of the last coupon area of the issued ticket.

18. A ticket issuing machine comprising means for initiating a cycle of operation, means for advancing a ticket supply strip past a printing position, means for receiving a slug having a plurality of printing faces thereon, means for intermittently advancing the slug a plurality of times during a single cycle of operation to bring successive printing faces to the printing position, means for effecting a plurality of printing operations by the slug between its advances to print a portion of the ticket strip by successive printing faces of the slug, means for effecting a plurality of printings of a serial number on said portion of the ticket strip between advances of the slug, and means controlled by the slug for changing the serial number only once for each cycle of operation.

19. A ticket issuing machine comprising means for initiating a cycle of operation, means for advancing a ticket supply strip past a printing position, means for receiving a slug having a plurality of printing faces thereon, means for intermittently advancing the slug a plurality of times during a single cycle of operation to bring successive printing faces to the printing position, means for effecting a plurality of printing operations by the slug between its advances to print a portion of the ticket strip by successive printing faces of the slug, and means controlled by a key for preventing reception of said slug by the machine in the absence of a key.

20. A ticket issuing machine comprising means for initiating a cycle of operation, means for automatically advancing a ticket supply strip past a printing position during a cycle of operation, means for receiving a slug having a plurality of printing faces thereon, means for automatically intermittently advancing the slug a plurality of times during the same cycle of operation to bring successive printing faces to the printing position, means for effecting a plurality of printing operations by the slug between its advances to print a portion of the ticket strip by successive printing faces of the slug, and means for thereafter automatically severing during the same cycle of operation said printed portion from the supply strip.

21. A ticket issuing machine comprising means for intermittently advancing a ticket supply strip during a single cycle of operation to bring successive coupon areas thereof to a printing position while said areas are attached together, means having an opening to the exterior for receiving a detached slug having a plurality of printing faces thereon, means for intermittently advancing the slug during the same cycle of operation in a direction across the face of the ticket strip and transverse to its direction of advance to bring successive printing faces to the printing position, and means for effecting a plurality of printing operations by the slug between advances of the ticket strip and the slug to print successive coupon areas of the ticket strip by successive printing faces of the slug.

22. A ticket issuing machine comprising means for initiating a series of subcycles of operation of said machine constituting a complete cycle, means for advancing a ticket strip during a single complete cycle of operation through a distance corresponding to the length of a plurality of coupon areas thereon to issue a ticket having such areas, said coupon areas being issued in a corresponding series of subcycles of operation included in said complete cycle, and means controlled by the size of a slug insertible in the machine to determine the number of subcycles of the machine performed during a complete cycle, the number of subcycles being variable with the size of the slug.

23. A ticket issuing machine comprising means for initiating a series of subcycles of operation of said machine constituting a complete cycle, means for advancing a ticket strip during a single complete cycle of operation through a distance corresponding to the length of a plurality of coupon areas thereon to issue a ticket having such areas, said coupon areas being issued in a corresponding series of subcycles of operation included in said complete cycle, means controlled by the size of a printing slug insertible in the machine to determine the number of subcycles of the machine performed during a complete cycle, the number of subcycles being variable with the size of the slug, and means for effecting variable printing of the coupon areas of a ticket by printing surfaces on the slug.

24. A ticket issuing machine adapted for operation through subcycles a plurality of which constitute a single complete cycle, comprising means for advancing a ticket strip having a plurality of coupon areas thereon a distance in each subcycle corresponding to one of said areas for issuance of a ticket having coupons corresponding to the number of subcycles in any given cycle, said machine having means for receiving a slug of any of a number of lengths, and control means engageable by a slug inserted in the machine operative for initiating operation of the machine, said control means being settable to a position according to the length of the slug inserted and being operative to determine the number of subcycles according to its set position.

25. A ticket issuing machine comprising means for receiving a slug having a plurality of printing faces thereon, means cooperable with a slug operative for initiating a complete cycle of operation of the machine upon insertion of the slug, means for advancing a ticket strip and effecting relative movement between the ticket strip and slug for enabling printing of successive portions of the ticket strip each by a different printing face during a single cycle of operation, means for effecting said printing, and means retaining the slug for preventing its removal between the beginning and end of a complete cycle of operation and means operable at the end of the cycle automatically releasing the slug from the retaining means.

26. A ticket issuing machine comprising means for advancing a ticket supply strip past a printing position, means for receiving a slug having a plurality of printing faces thereon, means operated upon insertion of a slug to a full inner position to initiate a cycle of operation, means operating during the cycle of operation to move said slug intermittently outwardly, step by step, to bring successive printing faces to the printing position, means for effecting a plurality of printing operations by the slug between its intermittent movements to print a portion of the ticket strip by each of the successive printing faces of the slug, means for severing said printed portion from the supply strip, and means for disabling said severing means during the cycle of operation until after the last printing operation and for operating the severing means after the last printing operation.

REUBEN H. HELSEL.

REFERENCES CITED

The following references are of record in the file of this patent:

UNITED STATES PATENTS

| Number | Name | Date |
|---|---|---|
| 1,091,498 | Friedlein | Mar. 31, 1914 |
| 1,233,245 | Jung | July 10, 1917 |
| 1,254,825 | Martin | Jan. 29, 1918 |
| 1,309,954 | Martin | July 15, 1919 |
| 1,392,929 | Fuller | Oct. 11, 1921 |
| 1,593,599 | Robertson | July 27, 1926 |
| 1,607,435 | Carroll | Nov. 16, 1926 |
| 1,795,509 | Robertson | Mar. 10, 1931 |
| 1,875,117 | O'Connor | Aug. 30, 1932 |
| 1,987,872 | Rosenthal | Jan. 15, 1935 |